US012620088B2

(12) United States Patent
Yao et al.

(10) Patent No.: US 12,620,088 B2
(45) Date of Patent: May 5, 2026

(54) SYSTEM AND METHOD FOR ARTICULAR CARTILAGE THICKNESS MAPPING AND LESION QUANTIFICATION

(71) Applicant: The Chinese University of Hong Kong, Hong Kong (CN)

(72) Inventors: Yongcheng Yao, Hong Kong (CN); Weitian Chen, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 554 days.

(21) Appl. No.: 18/095,474

(22) Filed: Jan. 10, 2023

(65) Prior Publication Data

US 2023/0222651 A1     Jul. 13, 2023

Related U.S. Application Data

(60) Provisional application No. 63/266,663, filed on Jan. 11, 2022.

(51) Int. Cl.
| | |
|---|---|
| *G06K 9/00* | (2022.01) |
| *G06T 7/00* | (2017.01) |
| *G06T 7/11* | (2017.01) |
| *G06T 7/187* | (2017.01) |
| *G06T 17/20* | (2006.01) |

(52) U.S. Cl.
CPC .............. *G06T 7/0012* (2013.01); *G06T 7/11* (2017.01); *G06T 7/187* (2017.01); *G06T 17/205* (2013.01); *G06T 2207/20081* (2013.01); *G06T 2207/30008* (2013.01)

(58) Field of Classification Search
CPC ......... G06T 7/0012; G06T 7/11; G06T 7/187; G06T 17/205; G06T 2207/20081; G06T 2207/30008; G06T 2207/20084; G06T 2210/41; G06T 17/00; G06T 7/12; G06T 7/149; G06T 7/62; G16H 30/20; G16H 50/70; G16H 30/40; G16H 50/20
See application file for complete search history.

(56) References Cited

U.S. PATENT DOCUMENTS

| | | |
|---|---|---|
| 7,184,814 B2 | 2/2007 | Lang et al. |
| RE43,282 E | 3/2012 | Alexander et al. |

(Continued)

FOREIGN PATENT DOCUMENTS

| | | |
|---|---|---|
| WO | 2003/012724 A1 | 2/2003 |
| WO | 2007/048463 A1 | 5/2007 |

OTHER PUBLICATIONS

Dam, et al., "An MRI marker of cartilage lesions in knee OA with Data from CCBR, OAI, and PROOF," Magn Reson Med., vol. 80, pp. 1219-1232 (2018).
Joseph, et al., "AI MSK clinical applications: cartilage and osteoarthritis. Skeletal Radiol," vol. 51(2), pp. 331-343 (Feb. 2022).
Liu, et al., "Deep Learning Approach for Evaluating Knee MR Images: Achieving High Diagnostic Performance for Cartilage Lesion Detection," Radiology, vol. 289, pp. 160-169 (2018).

(Continued)

*Primary Examiner* — Gregory A Morse
*Assistant Examiner* — Owais Iqbal Memon
(74) *Attorney, Agent, or Firm* — Kilpatrick Townsend & Stockton LLP

(57) ABSTRACT

Systems and methods for articular cartilage thickness mapping and lesion quantification operate on 3D medical image data to reconstruct cartilage surfaces, estimate surface normals, determine cartilage thickness, and identify regions of full-thickness cartilage loss (FCL). Reconstructed cartilage surfaces can be parcellated into subregions using a rule-based approach.

13 Claims, 21 Drawing Sheets

(56) References Cited

U.S. PATENT DOCUMENTS

| | | | |
|---|---|---|---|
| 9,289,153 B2 | 3/2016 | Lang et al. | |
| 2002/0147392 A1* | 10/2002 | Steines | G06T 7/12 |
| | | | 600/407 |
| 2002/0177770 A1* | 11/2002 | Lang | G01R 33/56 |
| | | | 600/410 |
| 2009/0190815 A1* | 7/2009 | Dam | A61B 5/4514 |
| | | | 382/128 |
| 2009/0306496 A1* | 12/2009 | Koo | A61B 5/7267 |
| | | | 600/416 |
| 2013/0006598 A1 | 1/2013 | Alexander et al. | |
| 2015/0117728 A1* | 4/2015 | Choi | G06T 7/149 |
| | | | 382/128 |
| 2016/0180520 A1 | 6/2016 | Huo et al. | |

OTHER PUBLICATIONS

Astuto, et al., "Automatic Deep Learning-assisted Detection and Grading of Abnormalities in Knee MRI Studies," Radiol Artif Intell, Radiology: Artificial Intelligence, vol. 3(3):e200165, 12 pages (2021).

Huo, et al., "Automatic Grading Assessments for Knee MRI Cartilage Defects via Self-ensembling Semi-supervised Learning with Dual-Consistency," Med Image Anal., vol. 80:102508, 12 pages (Aug. 2022).

Pedoia, et al., "3D convolutional neural networks for detection and severity staging of meniscus and PFJ cartilage morphological degenerative changes in osteoarthritis and anterior cruciate ligament subjects," J Magn Reson Imaging., vol. 49(2), pp. 400-410 (Feb. 2019).

* cited by examiner

*200*
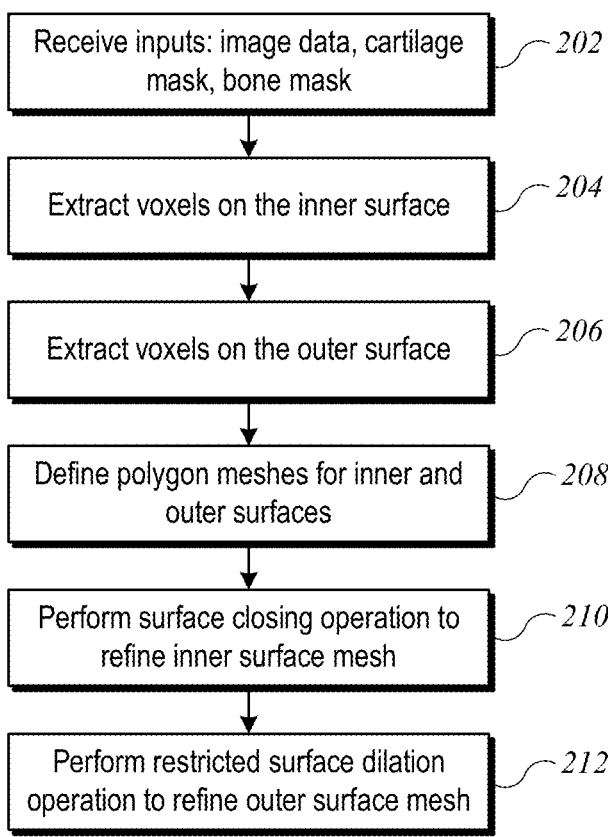
| |
|---|
| Receive inputs: image data, cartilage mask, bone mask |
*202*
| |
|---|
| Extract voxels on the inner surface |
*204*
| |
|---|
| Extract voxels on the outer surface |
*206*
| |
|---|
| Define polygon meshes for inner and outer surfaces |
*208*
| |
|---|
| Perform surface closing operation to refine inner surface mesh |
*210*
| |
|---|
| Perform restricted surface dilation operation to refine outer surface mesh |
*212*
*FIG. 2*

*300*

Receive inputs: domain mesh, target surface mesh, iteration count ⟿ *302*

Perform surface dilation operation using domain mesh, target surface mesh, and iteration count to obtain dilated surface mesh ⟿ *304*

Perform surface erosion operation using dilated surface mesh and iteration count to obtain fine-tuned surface mesh ⟿ *306*

Output fine-tuned surface mesh ⟿ *308*

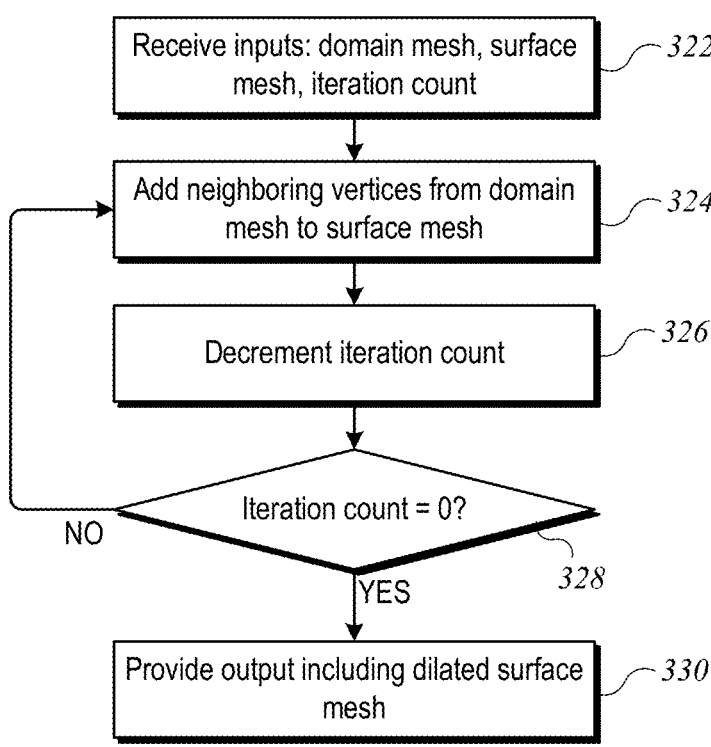
*320*
Receive inputs: domain mesh, surface mesh, iteration count — *322*
Add neighboring vertices from domain mesh to surface mesh — *324*
Decrement iteration count — *326*
Iteration count = 0? — *328*
NO
YES
Provide output including dilated surface mesh — *330*
*FIG. 3B*

*340*

Receive inputs: surface mesh, iteration count    *342*

Remove marginal vertices from surface mesh    *344*

Decrement iteration count    *346*

Iteration count = 0?    *348*

NO

YES

Provide output including eroded surface mesh    *350*

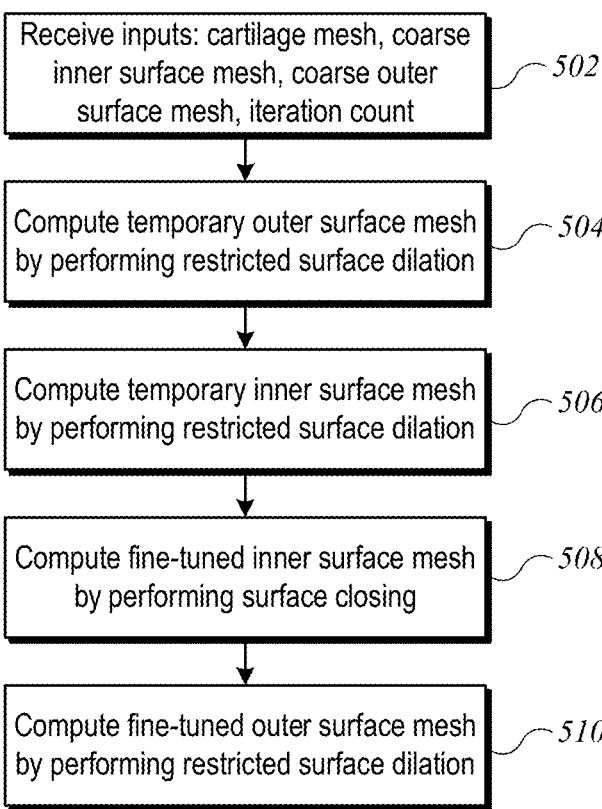

*500*

Receive inputs: cartilage mesh, coarse inner surface mesh, coarse outer surface mesh, iteration count *502*

Compute temporary outer surface mesh by performing restricted surface dilation *504*

Compute temporary inner surface mesh by performing restricted surface dilation *506*

Compute fine-tuned inner surface mesh by performing surface closing *508*

Compute fine-tuned outer surface mesh by performing restricted surface dilation *510*

Receive inputs: inner surface mesh, outer surface mesh     *602*

Estimate surface normal for each voxel on reference surface     *604*

Determine thickness along the normal direction     *606*

*700*

Receive inputs: vertices, surface normals, voxel size, neighborhood size, seed region
*702*

Initialize IVP, INP, SVP1, SNP1, SVP2, SNP2, AVP, ANP, OVP, ONP
*704*

Select initial seed vertices in seed region and corresponding initial seed surface normals
*706*

Add initial seed vertices to SVP1 and initial seed surface normals to SNP1
*708*

*710*
IVP empty?
NO     YES

Do Main Processing (FIGs. 7B-7C)
*712*

End
*714*

*1300*

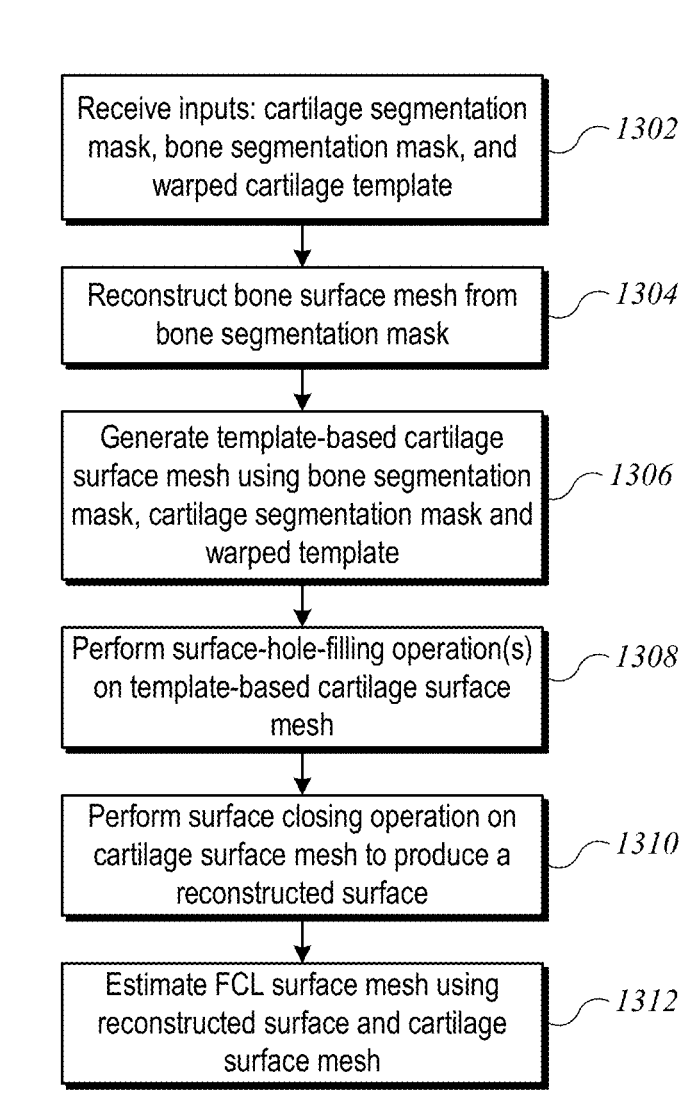

Receive inputs: cartilage segmentation mask, bone segmentation mask, and warped cartilage template   ~ *1302*

Reconstruct bone surface mesh from bone segmentation mask   ~ *1304*

Generate template-based cartilage surface mesh using bone segmentation mask, cartilage segmentation mask and warped template   ~ *1306*

Perform surface-hole-filling operation(s) on template-based cartilage surface mesh   ~ *1308*

Perform surface closing operation on cartilage surface mesh to produce a reconstructed surface   ~ *1310*

Estimate FCL surface mesh using reconstructed surface and cartilage surface mesh   ~ *1312*

MTC (left) &
LTC (right)

SYSTEM AND METHOD FOR ARTICULAR CARTILAGE THICKNESS MAPPING AND LESION QUANTIFICATION

CROSS-REFERENCES TO RELATED APPLICATIONS

This application claims the benefit of U.S. Provisional Application No. 63/266,663, filed Jan. 11, 2022, the disclosure of which is incorporated by reference herein.

TECHNICAL FIELD

The present disclosure relates generally to analysis of medical images of a joint (such as a knee) and in particular to systems and methods for articular cartilage thickness mapping and lesion quantification.

BACKGROUND

Osteoarthritis (OA) is one of the main causes of disability in older individuals. Efforts have been made to study the pathology of OA from various aspects. One area of interest is the progressive and irreversible cartilage loss at different clinical stages of OA. Early studies investigated the relationship between cartilage changes and disease severity using the mean thickness values of cartilage in certain pre-defined regions of interest (ROIs). Using mean thickness values of ROIs to correlate thickness changes to OA, while simple, omits important information on spatial variation of the thickness. Research has shown, for instance, that the spatial variation pattern of femoral cartilage thickness can facilitate the detection of OA-related differences. In recent years, research efforts that focus on the cartilage thickness pattern and utilize all information from the thickness map have been reported.

Regardless of which scheme is adopted, the first and foremost step is accurate cartilage thickness measurement. Existing techniques for cartilage thickness measurement include the nearest neighbor approach, the surface normal approach, the local thickness approach, and the potential field line approach. Among these, the nearest neighbor and surface normal approaches are the most widely applied methods. A nearest neighbor approach can be implemented using a brute force search algorithm that can calculate the Euclidean distance for each pair of points from two point-sets and find the shortest one. Alternatively, a sphere growing algorithm, which is generally more efficient, can be used. For the surface normal approach, one challenge is estimating the normal vector. Various studies have estimated a two-dimensional (2D) surface normal by fitting a section of curve to a cubic equation and estimated three-dimensional (3D) surface normal using principal component analysis (PCA).

In general, cartilage thickness measurement can be carried out in 2D or 3D space. Three-dimensional measurement has advantages, because 2D assessment heavily depends on the scanning position and is more likely to produce erroneous thickness values. However, 3D measurement approaches are less well developed.

SUMMARY

Certain embodiments of the present invention relate to systems and methods for articular cartilage thickness mapping and lesion quantification. Such systems and methods have applications in diagnosis and monitoring of osteoarthritis and other medical conditions. Systems and methods described herein can be applied to medical images obtained using various imaging modalities (including but not limited to magnetic resonance imaging) that can be used to generate image data including voxels, where each voxel corresponds to a discrete region in 3D space. Using the image data, a bone segmentation mask and a cartilage segmentation mask can be defined that associates particular voxels with tissue of a particular type (e.g., bone or cartilage). It should be understood that a particular image segmentation technique is not required and that the techniques described herein for mapping and measurement of cartilage thickness can be applied to any segmented 3D images for which a cartilage mask and/or a bone mask have been generated.

According to some embodiments, the segmentation masks can be defined using machine learning techniques. For instance, a first deep learning network (which can be, e.g., a convolutional neural network or the like) can be trained (e.g., based on training data that includes images labeled to indicate ground truth cartilage regions) to perform image segmentation on three-dimensional image data to generate a cartilage mask and optionally a bone mask. Jointly with training the first deep learning network, a second deep learning network (which can also be, e.g., a convolutional neural network or the like) can be trained to perform registration between a segmented image and a template image indicating a normal arrangement of cartilage in the target joint, e.g., by determining a deformation field to apply to the template that reshapes the template to match the segmented image. In some embodiments, the template image can be learned jointly with training of the first and second deep learning networks. For example, the template image can be initialized based on an average of the training data and updated during training. After training, the first and second deep learning networks can be applied to testing data, which can include 3D image data generated by imaging the target joint in a test subject. The first deep learning network can be applied to generate a cartilage mask and optionally a bone mask from the testing data, and the second deep learning network can be applied to generate a deformation field using the testing data and the (trained) template image. The resulting cartilage mask (and bone mask where present) and/or deformation filed can be used to quantify characteristics of cartilage of the target joint in the test subject, for instance by generating a cartilage thickness map and/or a map characterizing full-thickness cartilage loss.

According to some embodiments, cartilage thickness mapping can include reconstructing inner and outer cartilage surfaces (e.g., as polygon meshes) from cartilage and/or bone segmentation masks; estimating surface normals for locations on a first one of the surfaces (e.g., the inner surface); and computing a distance along the surface normals to the second one of the surfaces (e.g., the outer surface). Such techniques can provide a map indicating thickness of cartilage in various regions.

According to some embodiments, cartilage mapping can be used to quantify and characterize full-thickness cartilage loss (FCL). For instance, from the image data a first surface mesh corresponding to a bone-cartilage interface surface can be constructed. Using a template image warped by a deformation field determined from the image data, a second surface mesh corresponding to a complete bone-cartilage interface surface (in the absence of any FCL) can be constructed. Regions of FCL can be identified using the first and second surface meshes; for instance, FCL may be identified in areas where the second surface mesh is present and the first surface mesh is absent. Such techniques can enable quantification and/or mapping of FCL.

According to some embodiments, cartilage thickness maps and/or FCL maps can be parcellated into subregions of interest using rule-based parcellation, in which the boundaries of various subregions are defined by reference to general anatomical structures. Metrics for assessing cartilage or cartilage loss, such as mean thickness or percentage of FCL, can be computed for each subregion of interest.

The following detailed description, together with the accompanying drawings, will provide a better understanding of the nature and advantages of the claimed invention.

BRIEF DESCRIPTION OF THE DRAWINGS

FIG. 2 shows an example of a process for reconstructing cartilage surfaces from segmented image data according to some embodiments.

FIGS. 3A-3C are flow diagrams of a surface-closing process according to some embodiments.

FIG. 5 shows a flow diagram of a process for fine-tuning inner and outer cartilage surfaces according to some embodiments.

FIG. 13 shows a flow diagram of a process for full-thickness cartilage loss (FCL) estimation according to some embodiments.

DETAILED DESCRIPTION

Figure 1:
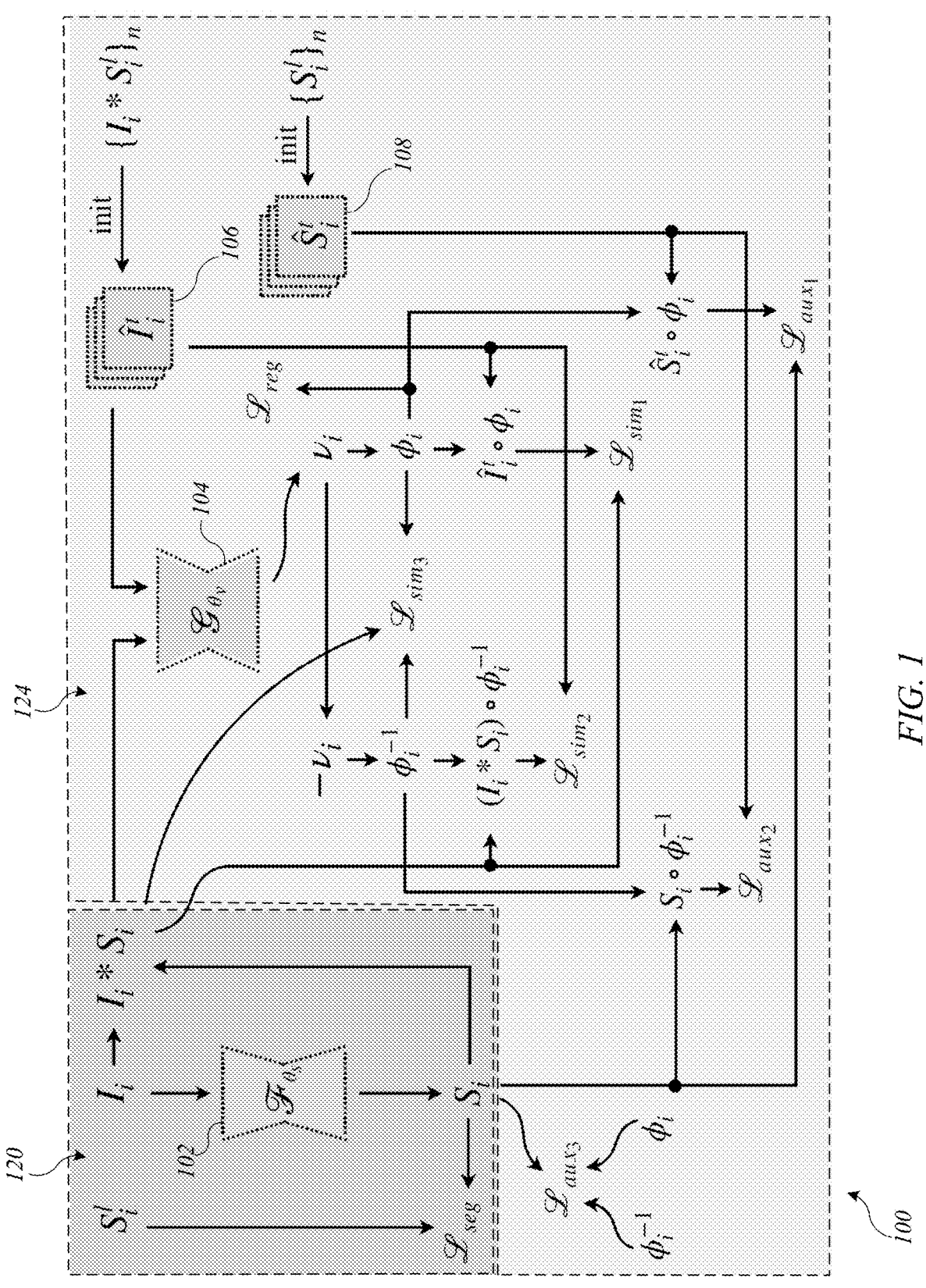
FIG. 1 shows a schematic overview of a segmentation, template generation, and registration network training model according to some embodiments.

The following description of exemplary embodiments of the invention is presented for the purpose of illustration and description. It is not intended to be exhaustive or to limit the invention to the precise form described, and persons skilled in the art will appreciate that many modifications and variations are possible. The embodiments have been chosen and described in order to best explain the principles of the invention and its practical applications to thereby enable others skilled in the art to best utilize the invention in various embodiments and with various modifications as are suited to the particular use contemplated.

Embodiments described herein include computer-implemented systems and methods that can analyze three-dimensional (3D) medical images of a particular joint (such as a knee) of a patient. The images can be, for example, magnetic resonance (MR) images obtained using conventional or other MR imaging systems. Other imaging modalities that enable identification of regions containing bone and regions containing cartilage can also be used, such as computed tomography. It is assumed that the image data provides a set of voxels, where each voxel corresponds to a discrete region in 3D space. The size of a voxel depends on the resolution of a particular imaging system. Using the image data, a bone segmentation mask and a cartilage segmentation mask can be defined, where a "segmentation mask" identifies particular voxels with tissue of a particular type (e.g., bone or cartilage). In some embodiments, the segmentation masks can be defined using machine learning techniques, examples of which are described below. It should be understood that a particular image segmentation technique is not required and that techniques for mapping and measurement of cartilage of the kind described herein can be applied to any segmented 3D images for which a cartilage mask and/or a bone mask have been generated.

According to some embodiments, cartilage thickness mapping includes reconstructing cartilage surfaces (e.g., as polygon meshes) from cartilage and bone segmentation masks and using surface-normal-based thickness determination to assess cartilage thickness. In some embodiments, the assessment can include an estimation of full-thickness cartilage loss (FCL) in addition to or instead of thickness mapping.

1. Image Segmentation and Mask Generation

As noted above, image analysis techniques described herein can be applied to images obtained using a variety of imaging modalities, including but not limited to MR imaging. For simplicity of description, it is assumed that the images represent the knee joint of a patient and include femoral and/or tibial articular cartilage. (As used herein, "cartilage" refers to articular cartilage that covers the end of a bone.) It should be understood that techniques described herein can also be applied to articular cartilage associated with other joints. Suitable images can be 3D images that include a 3D array of voxels of uniform size. Such images can be provided in slices along various directions, as is known in the art. Each voxel has attributes, including coordinates (identifying a position of the voxel in the array) and a signal value. It is assumed that different tissue types, including bone and cartilage, can be distinguished on the basis of signal values. Those skilled in the art will be familiar with images of this kind and techniques for obtaining such images.

In some embodiments, the images are segmented to identify the tissue type in each voxel, thereby generating a segmentation label for some or all of the voxels. Generation of segmentation labels can be performed using a trained neural network or other deep-learning algorithm; examples are described below. For cartilage analysis, the relevant segmentation labels can include labels indicating bone, cartilage, or neither. (While other tissue types, such as muscle, may be distinguished, bone and cartilage are the relevant types for purposes of this disclosure.) Given an image $I_i$, the segmentation model can output a cartilage mask (denoted $S_{i,c}$) and a bone mask (denoted $S_{i,b}$).

According to some embodiments, deep-learning models can be trained to perform image segmentation and image-to-template registration; template images can also be learned concurrently. Joint training of the models can be performed using a combination of supervised and unsupervised learning. For instance, a segmentation subnetwork $\mathcal{F}_{\theta_s}$ can be trained to perform cartilage and bone segmentation with supervised learning. A registration subnetwork $\mathcal{G}_{\theta_v}$ can be trained for template construction and template-to-image registration with unsupervised learning. Joint training of the two subnetworks can form a dual supervision mechanism that improves performance of each subnetwork. In some embodiments, given a set of images $\{I_i\}_n$ and segmentation labels $$\{S_i^l\}_n$$

as training data, the subnetworks can jointly learn a representative template image $I^t = \hat{I}^{t*}$ and a template segmentation $S^t = \hat{S}^{t*}$ (where * denotes an optimal estimation). The outputs from the subnetworks can include a predicted segmentation mask $S_i$ for a given input image $I_i$ and an estimated template-to-image deformation field $\phi_i$. These outputs can be used for cartilage morphometrics as described below.

FIG. 1 shows a schematic overview of a segmentation, template generation, and registration network 100 according to some embodiments. A segmentation subnetwork 102 (also denoted as $\mathcal{F}_{\theta_s}$) can be implemented as a convolutional neural network (CNN) or other deep-learning network. Subnetwork 102 can be trained to segment images, producing a bone mask and/or a cartilage mask. Training of subnetwork 102 can use using supervised learning with training images that have been annotated with ground-truth segmentation labels $$S_i^l.$$

The training images can include a combination of images of different knee joints, including joints with normal cartilage and in various stages of cartilage loss, including regions of partial and/or full-thickness cartilage loss. The segmentation loss function $\mathcal{L}_{seg}$ used in training can be based on a combination of distribution-based losses, regional-based losses, boundary-based losses, and compound losses. These loss factors are described, e.g., in Ma et al., Loss odyssey in medical image segmentation, Medical Image Analysis 71, 102035 (2021).

A registration subnetwork 104 (also denoted as $\mathcal{G}_{\theta_v}$) can be implemented as a CNN or other deep-learning network. Registration subnetwork 104 takes as inputs a masked image $(I_i * S_i)$ and a learnable template image 106 (also denoted as $$\hat{I}_i^t)$$

as inputs and outputs a stationary velocity field (SVF) $v_i$. The template-to-image deformation field $\phi_i$ can be computed from the SVF using numerical integration techniques. The template-to-image deformation field $\phi_i$ can be used for template-to-image warping $$\left(\hat{I}_i^t \circ \phi_i\right).$$

The inverse deformation field $$\phi_i^{-1}$$

can be computed from the negated SVF $(-v_i)$ and used for image-to-template warping $$\left((I_i * S_i) \circ \phi_i^{-1}\right).$$

Registration subnetwork 104 can be trained jointly with segmentation subnetwork 102, where segmentation subnetwork 102 generates segmentation masks during training, and the resulting masked images (rather than ground-truth segmentation) are used as inputs to registration subnetwork 104. In some embodiments, the learnable template image 106 can be initialized as an average of masked images in the training set and trained jointly with subnetworks 102, 104.

In some embodiments, image similarity constraints can be enforced during training by minimizing the following loss functions:

$$\mathcal{L}_{sim1} = \mathcal{L}_{sim}\left(\hat{I}_i^t \circ \phi_i, I_i * S_i\right), \tag{1}$$

$$\mathcal{L}_{sim2} = \mathcal{L}_{sim}\left((I_i * S_i) \circ \phi_i^{-1}, \hat{I}_i^t\right), \tag{2}$$

where $\mathcal{L}_{sim}$ can be any loss function used in image registration, including mean squared error (MSE), normalized cross-correlation (NCC), or local normalized cross-correlation (LNCC).

When the batch size is larger or equal to 2, an additional template-as-a-bridge image similarity loss can be calculated as:

$$\mathcal{L}_{sim3} = \frac{1}{N} \sum_{\substack{j=1 \dots N, \\ k=N-j+1}} \mathcal{L}_{sim}^{jk}\left((I_j * S_j) \circ \phi_j^{-1} \circ \phi_k, I_k * S_k\right), \tag{3}$$

where N is the batch size.

In some embodiments, a deformation field regularization term $\mathcal{L}$ can be added to the objective function. To enforce magnitude constraints, smoothness constraints, and anti-folding constraints on the deformation field, the regularization term can be formulated as:

$$\mathcal{L}_{reg} = \beta_1 \mathcal{L}_{mag}(\phi_i) + \beta_2 \mathcal{L}_{smooth}(\phi_i) + \beta_3 \mathcal{L}_{ant}(\phi_i), \tag{4}$$

where $$\mathcal{L}_{mag}(\phi_i) = \frac{1}{|\Omega|} \sum_{p \in \Omega} \|\phi_i(p)\|_F^2, \tag{5}$$

-continued $$\mathcal{L}_{smooth}(\phi_i) = \|\nabla \phi_i\|_F^2, \tag{6}$$

$$\mathcal{L}_{ant}(\phi_i) = \frac{1}{|\Omega|} \sum_{p \in \Omega} \sigma(-|J_\phi(p)|), \tag{7}$$

where $$\| \cdot \|_F^2$$

is the squared Frobenius norm, $\nabla$ is the gradient operator, $J_\phi(p)$ is the Jacobian matrix of the deformation field at position p, $|J_\phi|$ is the Jacobian determinant, and $\sigma(\cdot)$ is an activation function that returns zero for negative inputs. The general form of the activation function can be $\sigma(x)=\max(0,\exp(\delta x)-1)$, where $\delta>0$.

To leverage additional semantic information provided by segmentation subnetwork 102, auxiliary segmentation losses can be added to the objective function. The calculation of the auxiliary segmentation losses can be similar to Eqs. (1), (2), and (3) above, for instance:

$$\mathcal{L}_{aux1} = \mathcal{L}_{aux}(\hat{S}_i^t \circ \phi_i, S_i), \tag{8}$$

$$\mathcal{L}_{aux2} = \mathcal{L}_{aux}(S_i \circ \phi_i^{-1}, \hat{S}_i^t), \tag{9}$$

$$\mathcal{L}_{aux3} = \frac{1}{N} \sum_{\substack{j=1 \dots N, \\ k=N-j+1}} \mathcal{L}_{aux}^{jk}(S_j \circ \phi_j^{-1} \circ \phi_k, S_k), \tag{10}$$

where $\mathcal{L}_{aux}$ can be any segmentation loss function, including variants of cross-entropy loss, Dice loss, and boundary-based loss (e.g., as described in Ma et al. (2021)) and $$\hat{S}_i^t$$

is a learnable segmentation template (shown at 108 in FIG. 1).

Thus, in some embodiments the objective function used in training of network 100 can be:

$$\mathcal{L} = \alpha_1 \mathcal{L}_{sim1} + \alpha_2 \mathcal{L}_{sim2} + \alpha_3 \mathcal{L}_{sim3} + \beta_1 \mathcal{L}_{mag} + \tag{11}$$

$$\beta_2 \mathcal{L}_{smooth} + \beta_3 \mathcal{L}_{ant} + \gamma_1 \mathcal{L}_{aux1} + \gamma_2 \mathcal{L}_{aux2} + \gamma_3 \mathcal{L}_{aux3}$$

where $\{\alpha_i, \beta_i, \gamma_i\}_{i=1,2,3}$ are hyperparameters. As shown in FIG. 1, joint training of network 100 can include a combination of supervised learning (for subnetwork 102 in region 120) and unsupervised learning (for subnetwork 104 and templates 106, 108 in region 122).

It should be understood that network 100 is one example of an approach to segmentation of images and that any segmentation technique can be used to obtain a cartilage mask (denoted $S_{i,c}$) and a bone mask (denoted $S_{i,b}$). As described below, template-to-image deformation field $\phi_i$ can be used for certain cartilage morphometrics such as estimating full-thickness cartilage loss (FCL); however, as will become apparent, cartilage thickness analysis does not require a deformation field, and training or use of a registration subnetwork 104 is optional. Further, in some embodiments a cartilage mask is sufficient, and a bone mask is not required.

2. Cartilage Morphometrics

According to some embodiments, cartilage thickness mapping includes reconstructing the cartilage surface from the cartilage and bone segmentation masks and using surface-normal-based thickness mapping to assess cartilage thickness. In some embodiments, an estimation of full-thickness cartilage loss (FCL) can be performed in addition to or instead of thickness mapping. The procedure can be fully automated. Further, in some embodiments, cartilage can be parcellated into subregions using a rule-based parcellation scheme, and thickness measurements and/or FCL estimation can be applied to subregions.

For purposes of cartilage morphometrics, it is useful to reconstruct the cartilage surfaces. Articular cartilage has an "inner" surface (at the bone-cartilage interface) and an "outer" surface opposite the inner surface. In some embodiments, each of the inner and outer surfaces can be reconstructed as a polygon mesh. The mesh can include vertices (e.g., coordinates of points in a 3D space or other encoding of position data) and faces (e.g., triangles or other polygons) that encode connectivity information among the vertices. One of the two surfaces can be chosen as a "reference" surface, and surface normal can be computed for some or all of the vertices of the reference surface. A thickness map can be generated by determining respective distances from different vertices on the reference the surface to corresponding points on the outer surface, e.g., along a surface normal from the vertex on the reference surface. In principle, either the inner or outer surface can be chosen as the reference surface, and the choice of reference surface can affect the resulting thickness map. In the present description, the inner surface (the bone-cartilage interface) is used as the reference surface. This is a preferred choice for clinical applications, in part because the bone-cartilage interface is less likely to change over time than the outer surface of the cartilage. However, use of the outer surface as the reference surface is not precluded.

Inputs to a cartilage morphometric process can include segmented images, which can be obtained using techniques described in Section 1 or other techniques. From the segmented images, polygon meshes corresponding to the inner and outer cartilage surfaces can be reconstructed. A thickness map can be generated by determining surface normals associated with the vertices of the reference surface mesh (e.g., the inner surface mesh) and determining a distance (e.g., Euclidean distance) along a direction defined by the surface normal from the vertex of the reference surface mesh to a point on the other surface mesh (e.g., the outer surface mesh). Additional morphometric analysis can also be performed using the surface meshes and/or thickness maps. The following sections describe example implementations.

2.1. Cartilage Surface Reconstruction

As described above, various techniques can be used to provide segmented images, in which different voxels are associated with tissues of various types (e.g., bone, cartilage, or other). According to some embodiments, where a bone mask and a cartilage mask are available, voxels on the bone/cartilage interface can be identified using morphological operations. First, to remove gaps between the bone mask and cartilage mask, the bone mask can be expanded until the bone mask "attaches" to the cartilage mask. "Attaching" in this context can include instances where the masks intersect or abut each other; in some embodiments, the attachment can be seamless (no gaps). For instance, a union of the cartilage and bone masks can be formed, and 3D hole-filling can be applied to the union of cartilage and bone masks. An expanded bone mask can be generated by subtracting the cartilage mask from the union mask. Three-dimensional boundaries of the cartilage map and an inverse of the expanded bone mask can be calculated. The union of the two boundaries can be used to define a polygon mesh for the bone-cartilage interface.

FIG. 2 shows an example of a process 200 for cartilage surface reconstruction according to some embodiments. Process 200 can be used when both a cartilage mask ($S_{i,c}$) and a bone mask ($S_{i,b}$) corresponding to an image $I_i$ are available. Cartilage and bone masks corresponding to an image can be generated using any of the techniques described above or other techniques. At block 202, process 200 can receive image data including a bone mask and a cartilage mask.

At block 204, process 200 can extract voxels on the inner surface (the bone-cartilage interface). For instance, voxels $$V_{i,c}^{in}$$

can be extracted according to:

$$v_{i,c}^{in} = \mathcal{O}_b(S_{i,c}) \cap \mathcal{O}_b(\mathcal{O}_{inv}(\mathcal{O}_f(S_{i,c}, S_{i,b}) - S_{i,c})), \quad (12)$$

where $\mathcal{O}_b(\cdot)$ denotes the boundary extractor, $\mathcal{O}_{inv}(\cdot)$ denotes the inverse operation, and $\mathcal{O}_f(\cdot,\cdot)$ denotes gap filling via bone region growing.

At block 206, voxels on the outer surface of cartilage can be extracted. For instance, voxels $$V_{i,c}^{out}$$

can be extracted according to:

$$V_{i,c}^{out} = \mathcal{O}_b(S_{i,c}) - V_{i,c}^{in}. \quad (13)$$

At block 208, a polygon mesh representation $$\left(M_{i,c}^{in}\right)$$

for the inner surface and a polygon mesh $$\left(M_{i,c}^{out}\right)$$

for the outer surface can be defined, e.g., by applying the Marching Cube algorithm or other suitable algorithms to $$V_{i,c}^{in} \text{ and } V_{i,c}^{out}.$$

A polygon mesh representation ($M_{i,c}$) for the cartilage volume can be defined in a similar manner.

At block 210, the inner surface mesh $$M_{i,c}^{in}$$

can be refined (or fine-tuned), e.g., by performing a surface-closing operation. "Surface closing" refers to a morphological operation that can be used to remove artificial holes in a surface (e.g., holes due to missing voxels in the mask). In some embodiments, surface closing can include a dilation operation that extends a surface mesh by one layer of polygon faces along its edge, followed by an erosion operation that removes a layer of polygon faces from the edge. In this manner, missing faces can be added to a mesh while retaining the edge of the surface. For example, a surface closing operation $\mathcal{O}_c(\cdot)$ can be defined in a surface domain $\Omega_{surf} \subset \mathbb{R}^2$. A surface closing operation applied to inner surface mesh $$M_{i,c}^{in}$$

can be formulated as:

$$\mathcal{O}_c(M_{i,c}^{in} \mid \Omega_{surf}) = \mathcal{O}_e^{n_e}(\mathcal{O}_d^{n_d}(M_{i,c}^{in} \mid \Omega_{surf})) \quad (14)$$

where $$\mathcal{O}_e^{n_e}(\cdot)$$

denotes compound surface erosion with $n_e$ iterations and $$\mathcal{O}_d^{n_d}(\cdot \mid \Omega_{surf})$$

denotes compound surface dilation in a surface domain$_{surf}$ with $n_d$ iterations. At block 210 of process 200, the surface domain $\Omega_{surf}$ can be the cartilage mesh $M_{i,c}$.

Figure 3A:
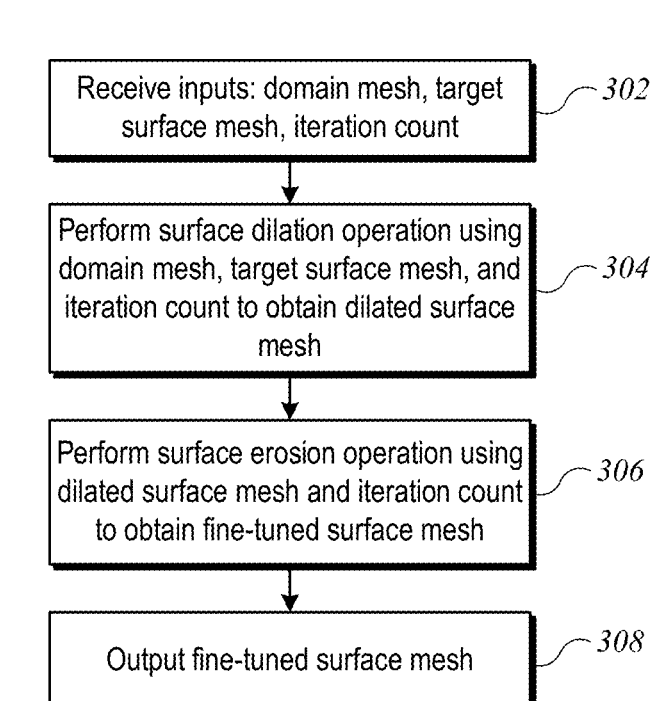
Figure 3C:
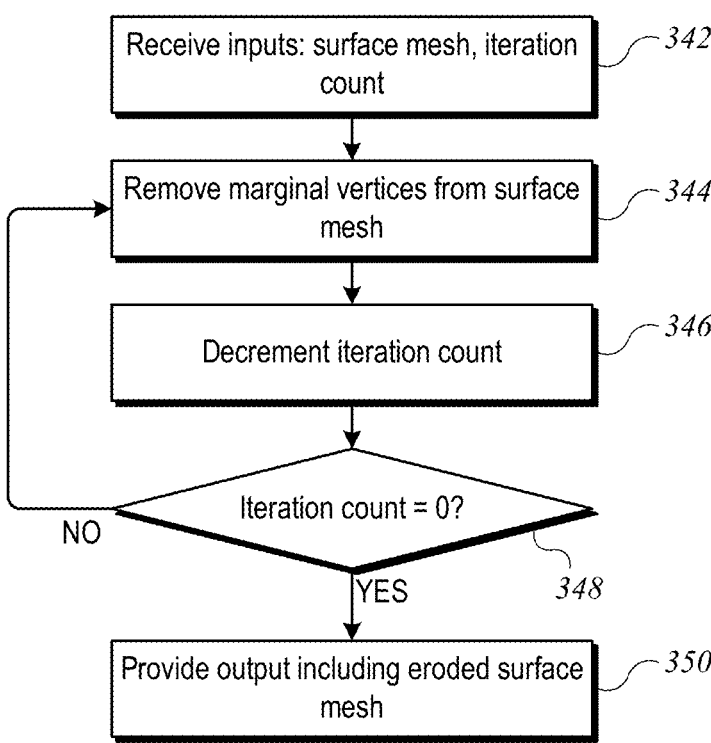

FIGS. 3A-3C are flow diagrams of a surface-closing process 300 according to some embodiments. Process 300 can be used at block 210 of process 200 and/or in other processes where closing artificial holes in a surface mesh is desirable. Referring first to FIG. 3A, at block 302, inputs are provided, which can include a domain mesh defining a surface domain (e.g., cartilage mesh $M_{i,c}$), a surface mesh (e.g., inner surface mesh $$M_{i,c}^{in}),$$

and an iteration count ($n_d$, $n_e$) specifying the number of iterations of surface dilation and surface erosion to perform. In some embodiments, $n_d = n_e$.

At block 304, surface dilation can be performed using the domain mesh, surface mesh, and iteration count for surface dilation to obtain a dilated mesh. FIG. 3B shows a flow diagram of a process 320 for surface dilation that can be used at block 304 according to some embodiments. At block 322, the inputs (including a domain mesh, a surface mesh, and an iteration count for surface dilation) are received. At block 324, neighboring vertices from the domain mesh can be added to the surface mesh. At block 326, the iteration count is decremented. At block 328, if the iteration count has not yet reached zero, another iteration of block 324 is performed. At block 330, output, including the dilated surface mesh, can be returned.

Referring again to FIG. 3A, at block 306, surface erosion can be performed using the dilated surface mesh obtained at block 304 and iteration count for surface erosion. FIG. 3C shows a flow diagram of a process 340 for surface erosion that can be used at block 306 according to some embodiments. At block 342, the inputs (including a surface mesh and an iteration count for surface erosion) are received. At block 344, marginal vertices can be removed from the surface mesh. At block 346, the iteration count is decremented. At block 348, if the iteration count has not yet reached zero, another iteration of block 344 is performed. At block 350, output, including the eroded surface mesh produced by iteratively executing block 344, can be returned.

Figure 4:
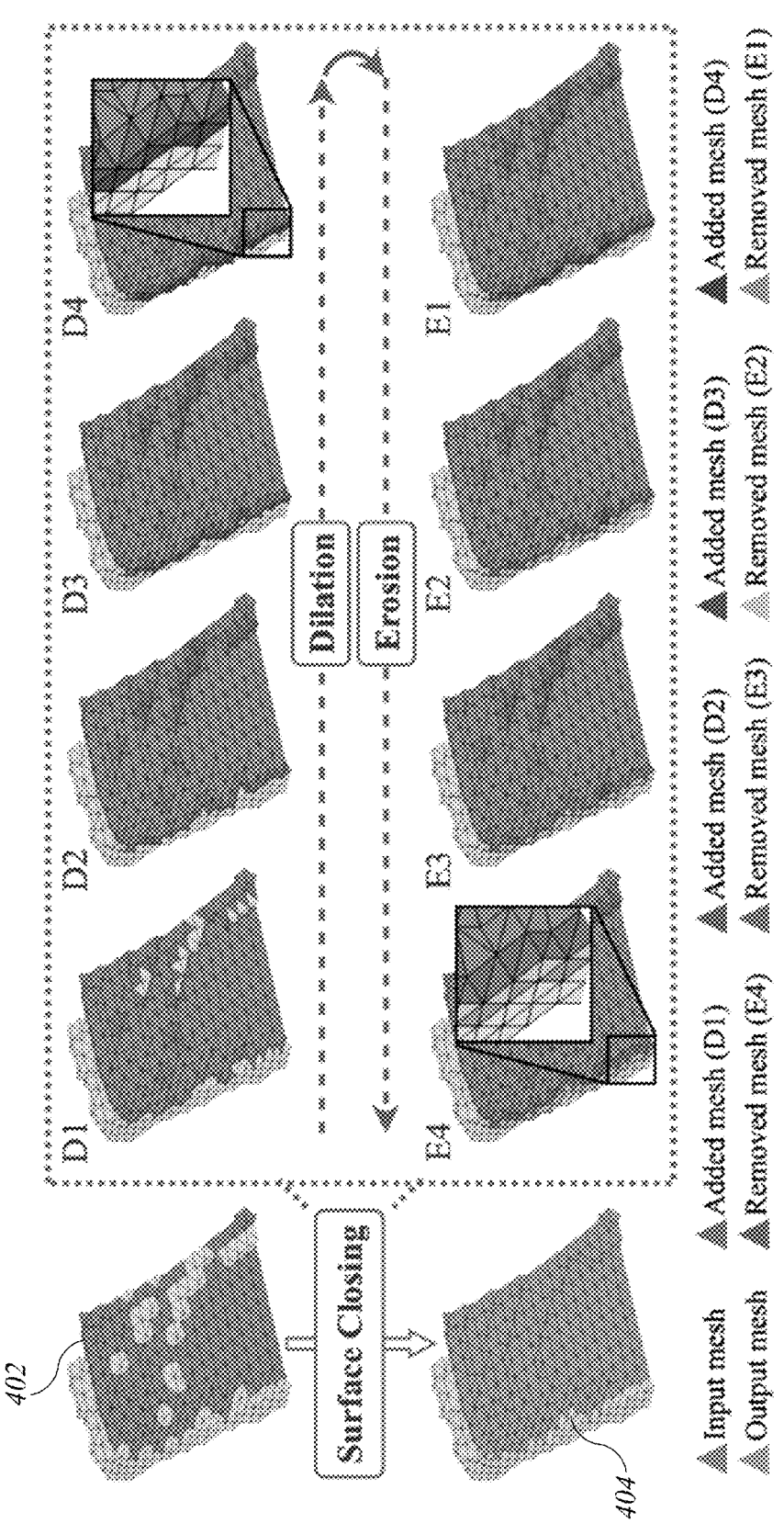
FIG. 4 shows examples of surface meshes at various stages of a surface closing operation according to some embodiments.

Further illustrating surface closing operations, FIG. 4 shows meshes illustrating different stages of a surface closing operation according to some embodiments. In this example, $n_d = n_e = 4$. As shown, the input surface mesh 402 has holes due to missing voxels. Each iteration of surface dilation (D1-D4) adds neighboring vertices to the mesh, thereby eliminating holes, while each iteration of surface erosion (E1-E4) removes marginal vertices from the mesh without creating holes, resulting in a hole-free surface mesh 404.

Referring again to FIG. 2, at block 212, the outer surface mesh $$M_{i,c}^{out}$$

can be refined (or fine-tuned), e.g., by performing a restricted surface dilation operation. As used herein, "restricted surface dilation" refers to a surface dilation operation (e.g., similar to the surface dilation process in FIG. 3B) with a boundary restriction $\mathcal{B}$ in the surface domain and an unlimited number of iterations. For example, a restricted surface closing operation $\mathcal{O}_{rd}(\cdot)$ can be defined in a restricted surface domain $$\Omega_{surf}^{\mathcal{B}} \subset \Omega_{surf}.$$

Choosing $$\Omega_{surf}^{\mathcal{B}} = M_{i,c} - M_{i,c}^{in},$$

a restricted surface dilation applied to outer surface mesh $$M_{i,c}^{out}$$

can be formulated as:

$$\mathcal{O}_{rd}(M_{i,c}^{out}) = \mathcal{O}_d^{\infty}(M_{i,c}^{out} \mid \Omega_{surf}^{\mathcal{B}}), \quad (15)$$

where $$\mathcal{O}_d^{\infty}(\cdot)$$

denotes surface dilation (e.g., according to process 320 of FIG. 3B) in the restricted surface domain $$\Omega_{surf}^{\mathcal{B}};$$

the ∞ symbol indicates that iterations continue until no additional vertices can be added.

Process 200 is illustrative and variations and modifications are possible. By way of example, FIG. 5 shows a flow diagram of a process 500 for fine-tuning inner and outer cartilage surfaces according to some embodiments. Process 500 can be used in place of blocks 210 and 212 of process 200. In some embodiments, process 500 can be performed iteratively until holes are filled. The number of iterations can be chosen based on experiments for a particular type of image (e.g., MRI images with a particular resolution) and segmentation algorithm to determine the number of iterations needed to fill holes in the surface mesh. In various embodiments, the number of iterations can be any number from 1 to 7 or a higher number.

At block 502, inputs are provided, which can include a mesh defining a surface domain (e.g., cartilage mesh $M_{i,c}$ as determined at block 208 of process 200), an inner surface mesh (e.g., inner surface mesh $$M_{i,c}^{in}$$

as determined at block 208 of process 200), an outer surface mesh (e.g., outer surface mesh $$M_{i,c}^{out}$$

as determined at block 208 of process 200), and an iteration count specifying the number of iterations of surface erosion $n_e$.

At block 504, a temporary outer surface mesh $$M_{i,c}^{out(T)}$$

can be computed by performing a restricted surface dilation operation (e.g., as described above with reference to block 212 of process 200) on the input outer surface mesh $$M_{i,c}^{out}.$$

The restricted surface domain for this operation can be defined as $$\Omega_{surf}^{B} = M_{i,c} - M_{i,c}^{in}.$$

At block 506, a temporary inner surface mesh $$M_{i,c}^{in(T)}$$

can be computed by performing a restricted surface dilation operation (e.g., as described above with reference to block 212 of process 200) on the input inner surface mesh $$M_{i,c}^{in}.$$

The restricted surface domain for this operation can be defined as $$\Omega_{surf}^{B} = M_{i,c} - M_{i,c}^{out(T)},$$

where $$M_{i,c}^{out(T)}$$

is the temporary outer surface mesh computed at block 504.

At block 508, a fine-tuned inner surface mesh $$M_{i,c}^{in(F)}$$

can be computed by performing a surface closing operation (e.g., as described above with reference to block 210 of process 200) on the temporary inner surface mesh $$M_{i,c}^{in(T)}$$

computed at block 506.

At block 510, a fine-tuned outer surface mesh $$M_{i,c}^{out(F)}$$

can be computed by applying restricted surface dilation (e.g., as described above with reference to block 212 of process 200) to the temporary outer surface mesh $$M_{i,c}^{out(T)}.$$

The restricted surface domain for this operation can be defined as $$\Omega_{surf}^{B} = M_{i,c} - M_{i,c}^{in(F)},$$

wherein $$M_{i,c}^{in(F)}$$

is the fine-tuned inner surface mesh computed at block 508.

According to some embodiments, where a bone mask is not available, a "single-mask" surface reconstruction algorithm can be applied to identify inner and outer cartilage surfaces from a cartilage mask. In some embodiments, prior knowledge of anatomical structure and approximate image orientation (e.g., the general shape of knee cartilage) can provide starting data. This knowledge can provide a reference vector, which can be defined to point in the direction from outer surface to inner surface. First, a skeleton surface is constructed for the cartilage mask. The skeleton surface can be constructed, e.g., by stacking 2D skeletons of some or all of the sagittal and coronal image slices. For each voxel on the skeleton surface, a surface normal can be estimated, e.g., using singular value decomposition (SVD) as described below. An orientation correction can be applied to the estimated surface normals, e.g., using correction techniques described below, so that all surface normals point from the skeleton surface toward the bone/cartilage interface. Thereafter, a searching algorithm can be used to select voxels on a surface in a specific direction. In particular, for each surface normal on the skeleton surface, the voxel on the cartilage surface (as identified from the cartilage mask) that is closest to the intersection of the cartilage surface and the surface normal can be selected. The result is a primary set of voxels on the bone-cartilage interface (the inner surface of the cartilage). The searching algorithm can also be applied to inverted surface normal to identify a primary set of voxels on the outer surface of the cartilage. Thereafter, inner and outer surface meshes can be generated from the primary sets of voxels, and the meshes can be refined using surface closing and restricted surface dilation processes as described above.

It should be noted that a similar single-mask surface reconstruction process can be applied to any region of interest having an extent in a thickness direction that is much less than the extent in other directions.

In some embodiments, additional mesh smoothing operations can be applied to the refined (or fine-tuned) surface meshes, such as surface meshes generated using process 200 and/or 500 and/or single-mask surface reconstruction. Mesh smoothing can be used to reduce local fluctuations of a surface mesh while retaining global morphological features. In some embodiments, mesh smoothing can be implemented by replacing the coordinates of a vertex with the average coordinates of connected vertices. Mesh smoothing can be performed iteratively. The number of iterations can be preselected (e.g., 1, 2, or 3 iterations) or determined dynamically based on one or more measured criteria related to a parameter of the surface mesh (e.g., magnitude of local fluctuations). In some embodiments, mesh smoothing of the inner surface can improve surface normal estimation because vertices on the smoothed surface are more likely to lie on the same plane. Mesh smoothing of the inner and outer surface can result in more consistent estimated thickness values in a thickness map.

2.2. Cartilage Thickness Mapping

According to some embodiments, a cartilage thickness map can be generated using surface meshes representing the inner and outer cartilage surfaces. To generate a thickness map, surface normals for one of the surfaces (e.g., the inner surface, which corresponds to the bone/cartilage interface) can be determined, and thickness can be defined based on the Euclidean distance along a surface normal from the inner surface to a destination on the outer surface.

Figure 6:
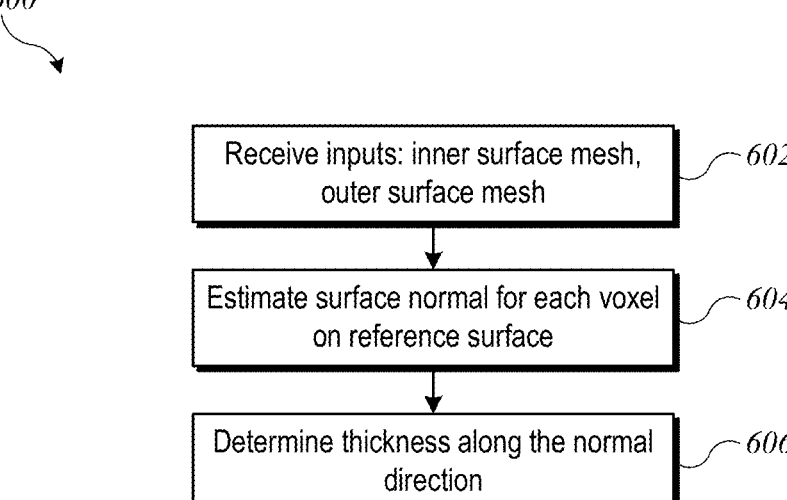
FIG. 6 shows a flow diagram of a process for cartilage thickness determination according to some embodiments.

FIG. 6 shows a flow diagram of a process 600 for cartilage thickness mapping according to some embodiments. Process 600 can receive inputs (block 602) including an inner surface mesh and an outer surface mesh defining cartilage surfaces. Such meshes can be generated, e.g., using techniques described in Section 2.1; other techniques can be substituted. Additional inputs, such as images, segmentation masks, and so on can also be provided. At block 604, one of the two cartilage surfaces (e.g., the inner cartilage surface) is chosen as a reference surface, and a surface normal for each vertex (or voxel) on the reference surface is estimated. For instance, as described in Section 2.2.1 below, singular value decomposition (SVD) can be used to estimate surface normals, followed by an orientation correction so that all of the surface normals are oriented in the same direction and spatial smoothing of the surface normals. At block 606, a thickness map can be determined based on the Euclidean distance along the normal direction between the reference surface and the other surface; Section 2.2.2 below describes examples of determining thickness and generating thickness maps according to various embodiments.

2.2.1. Surface Normal Estimation and Orientation Correction

In some embodiments, surface normals can be determined from a surface mesh using singular value decomposition (SVD). For instance, a position of a voxel on the bone-cartilage interface $$M_{i,c}^{in}$$

can be defined using a locator function defined on the image domain, e.g., using the three-dimensional voxel size and index coordinates of the voxel. The position of a voxel i can be represented as a row vector $\vec{x}_i=[x_i \ y_i \ z_i]$ (where $x_i$, $y_i$, and $z_i$ are real numbers). A number k of nearest neighbor points of voxel i can define a point set, denoted as $N(p)=\{\vec{x}_i, \vec{x}_{i1}, \vec{x}_{i2}, \ldots \vec{x}_{ik}\}$. A position matrix $\tilde{P}$ is for voxel i can be constructed by concatenating $\vec{x}_i$ and $\vec{x}_{ik}$ by row, and a row-wise average matrix $\overline{P}$ for voxel i can be computed according to:

$$\overline{P} = \frac{1}{|N(p)|}\mathbb{1}\tilde{P}, \ \mathbb{1} \in \mathbb{R}^{1,|N(p)|}, \tag{16}$$

where |N(p)| denotes the neighborhood size k. A centered position matrix P can be computed as $$P = \tilde{P} - \overline{P}. \tag{17}$$

Put differently, each row vector in position matrix $\tilde{P}$ can be centered by subtraction of a mean vector $$\vec{x}_{mean} = \frac{\vec{x}_i + \vec{x}_{i1} + \cdots + \vec{x}_{ik}}{|N(p)|}, \tag{18}$$

thereby producing centered position matrix P.

Using SVD, centered position matrix P can be decomposed into a matrix product $P=M\Sigma T^T$, where U and V are orthogonal matrices and $\Sigma$ is a diagonal matrix whose non-zero diagonal entries $\sigma_j=\Sigma_{jj}$ are the singular values. The columns of matrices U and V are called, respectively, the left-singular vectors and right-singular vectors of P. The matrix E can be uniquely determined by P, and the right-singular vector in matrix V that corresponds to the minimum singular value in $\Sigma$ represents the direction of least data variation. This direction can be used as an initial estimate of the surface normal. (In some embodiments, $\Sigma$ can be a square diagonal matrix, and P can be decomposed such that the singular values $\sigma_j$ are in descending order, so that the rightmost column of matrix V represents the direction of least data variation.) To summarize, given the centered position matrix P for a particular voxel p, an initial estimate of the surface normal at that voxel (denoted $\tilde{\mathfrak{N}}$ (p)) is given by:

$$\tilde{\mathfrak{N}}(p) = O_{svd}(S(P)), \ p \in M_{i,c}^{in}, \tag{19}$$

where S(•) denotes SVD and $O_{svd}$(•) denotes selection of the right-singular vector corresponding to the minimum singular value in $\Sigma$.

It should be noted that the selected right-singular vector captures the direction of least data variation and may arbitrarily point inward or outward relative to the bone-cartilage interface surface. It is therefore helpful to perform an orientation correction operation that results in all surface normals pointing in the same direction (e.g., inward).

Various orientation correction algorithms can be used. For instance, a distance metric and majority voting (or other suitable methods) can be combined to provide a two-tier orientation correction scheme in which, for each surface normal, the Euclidean distances from the endpoints of the original and flipped surface normals to the outer surface are computed and the direction with smaller Euclidean distance is chosen as the positive direction; subsequently, each surface normal can be flipped if a majority of the neighboring surface normals have opposite direction.

Figure 7A:
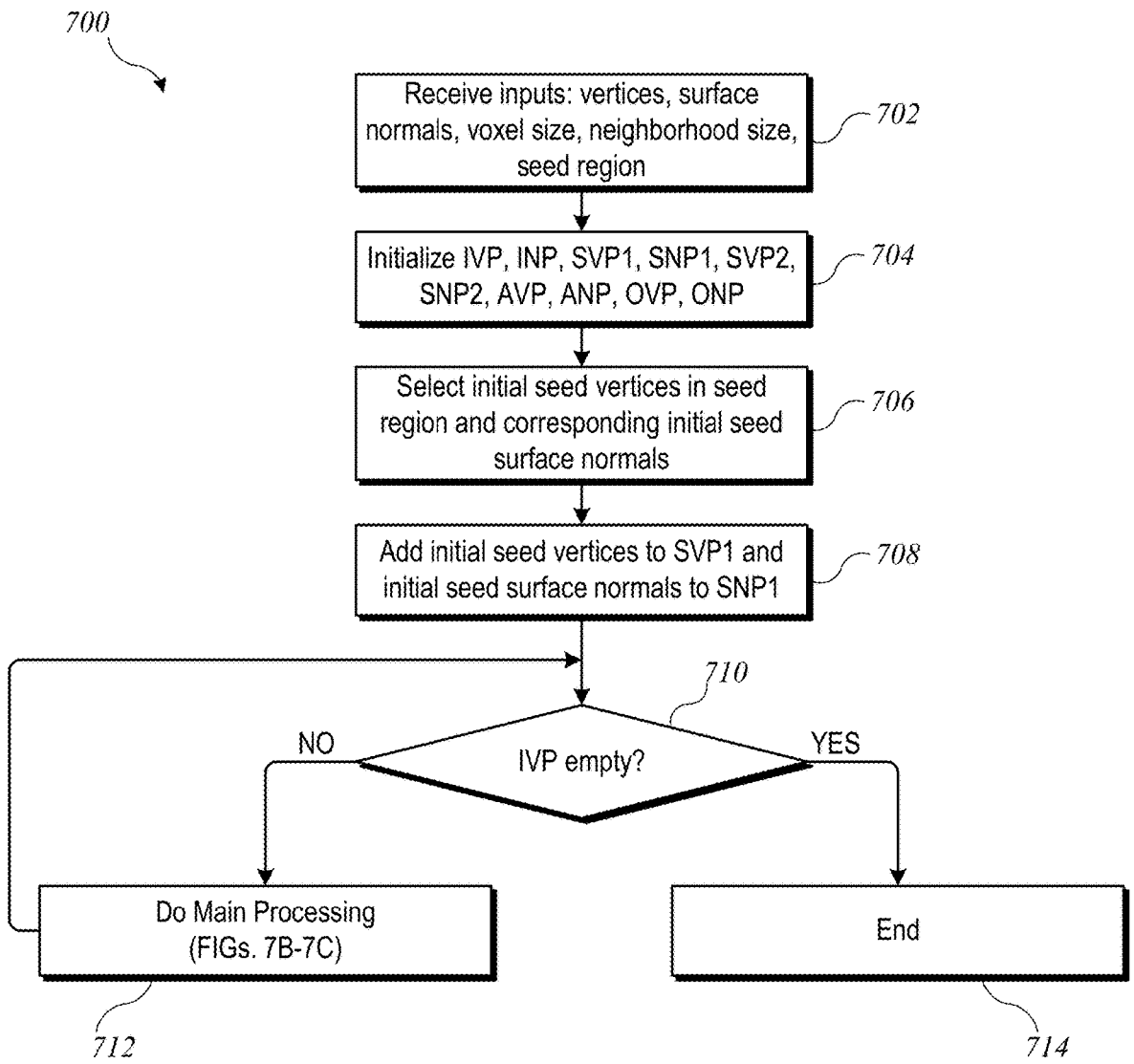
FIGS. 7A-7C show a flow diagram of a process for correcting orientation of surface normals according to some embodiments.
Figure 7B:
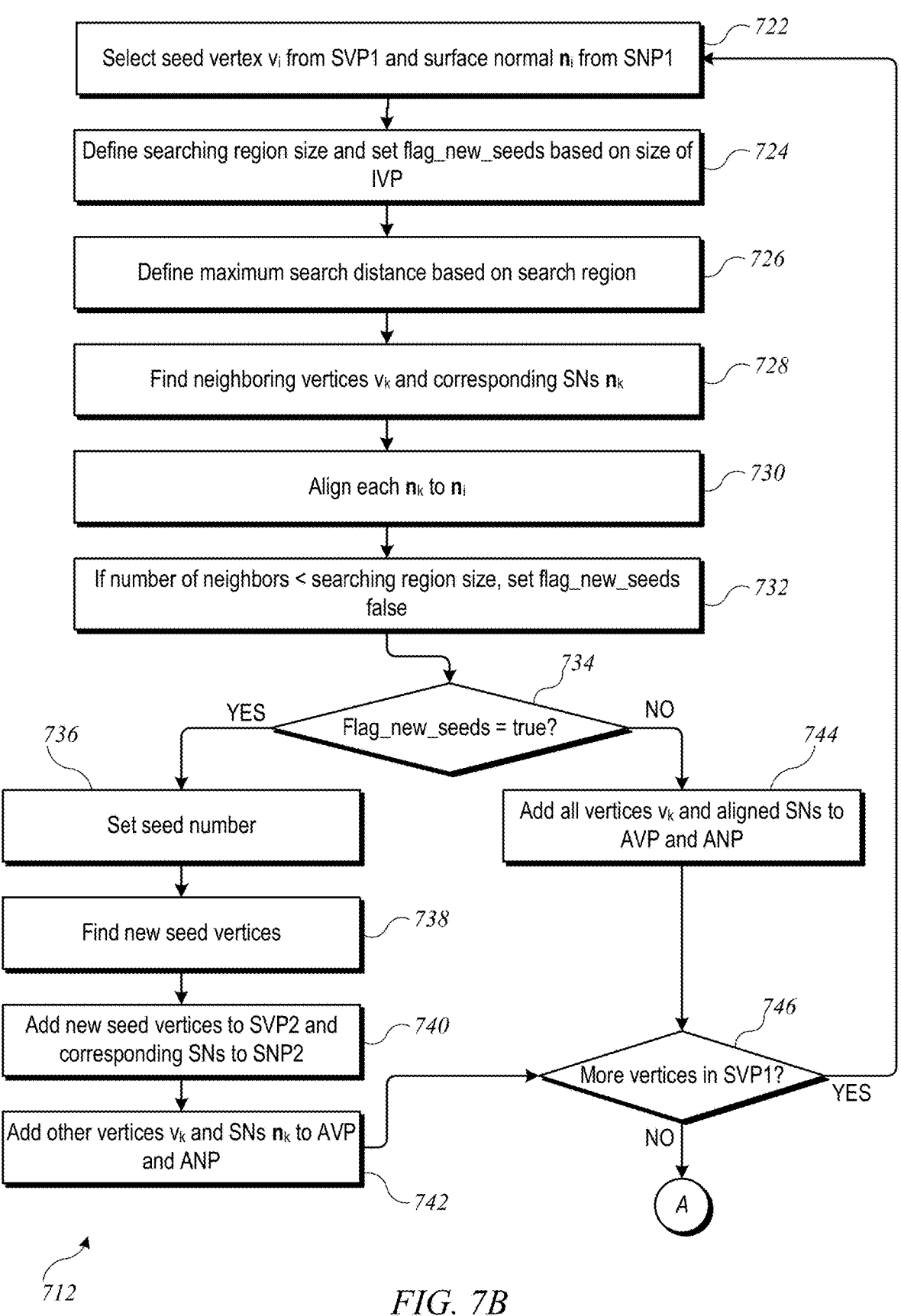
Figure 7C:
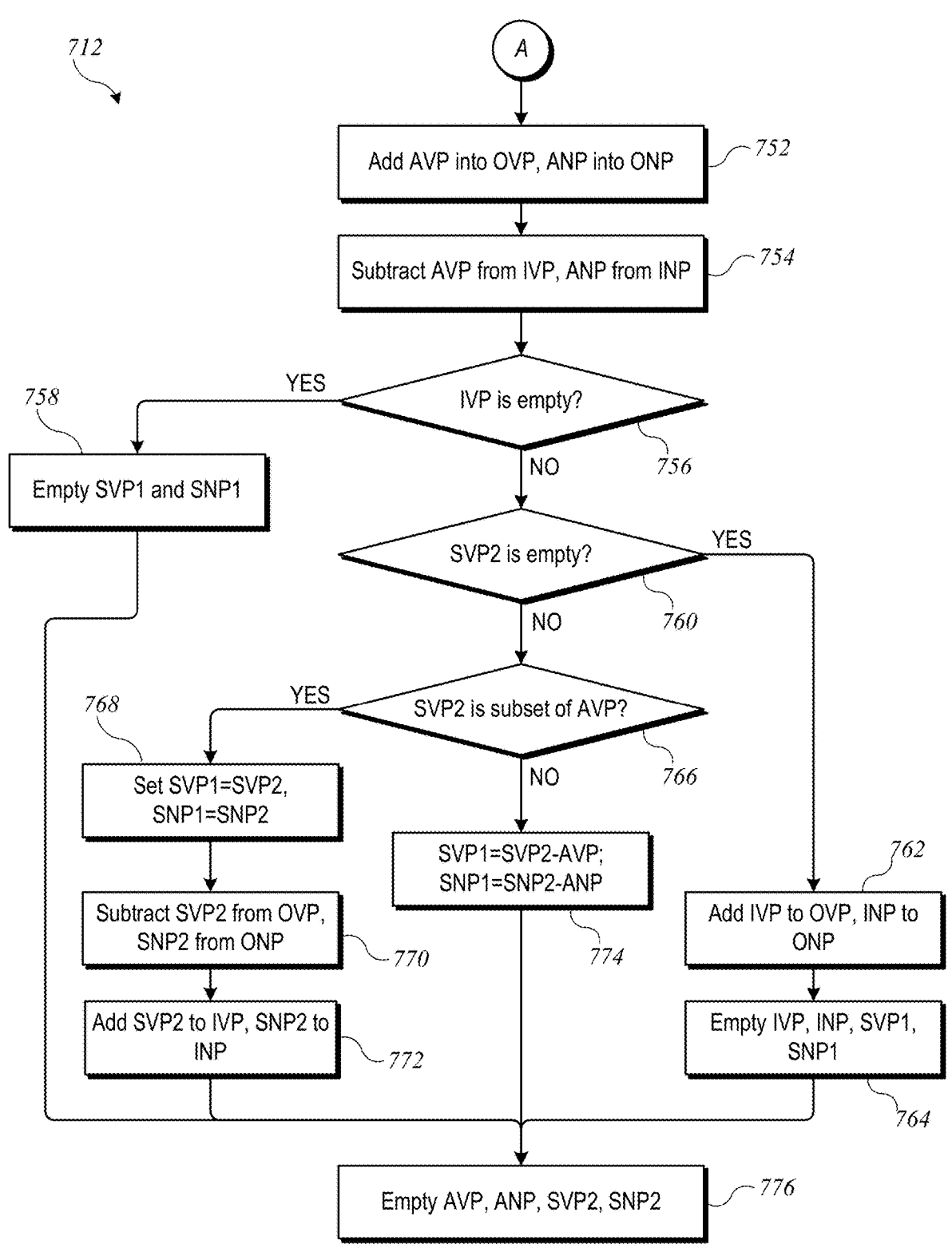

FIGS. 7A-7C show a flow diagram of a process 700 for orientation correction according to some embodiments. Referring first to FIG. 7A, process 700 includes an initialization stage followed by a main processing loop (shown in FIGS. 7B and 7C) that can be repeated until all surface normal have been correctly oriented.

At block 702, process 700 can receive inputs. The inputs can include: a set of vertices (or voxels) {p} for the surface on which normals are defined; a corresponding set of surface normals (e.g., { $\tilde{\mathfrak{N}}$ (p)} as defined above); a voxel size (which can be read from the header of an image data file in a standard format such as the Digital Imaging and Communications in Medicine (DICOM) format or the Neuroimaging Informatics Technology Initiative (NIfTI) format); a neighborhood size (which can be, e.g., the same size k used for SVD or a different size selected adaptively by the algorithm according to the type of cartilage and image resolution); and a seed region (which can be a small region of the surface). In some embodiments, the neighborhood size can be selected by dividing the set of vertices {p} into a number ($n_c$) of clusters, and the number of vertices in each cluster can be the neighborhood size. The parameter $n_c$ can be set to 1000 for femoral cartilage and 200 for lateral/medial tibial cartilage; other values can also be selected. The seed region can be determined automatically, as described below. An image file in a standard format such as DICOM or NIfTI stores spatial orientation information in the header and image data in a data array. The affine transformation matrix in the header can be used to establish a correspondence between the axes of the data array and the relative orientation of the human body (e.g., left, right, posterior, anterior, inferior, and superior directions). Since different image acquisition protocols may result in different orientations of the data array, an image orientation standardization procedure can be carried out prior to executing process 700 (or during block 702 of process 700). For example, an image can be reoriented according to the RAS+convention in which the positive axes of the image coordinate system point in the right, anterior, and superior directions. With the reoriented image, a seed region for each cartilage type can be selected automatically without human intervention. For instance, for femoral cartilage, the inferior central part can be selected as the seed region, and for lateral/medial tibial cartilage, the central area can be selected as the seed region.

At block 704, several pools are initialized to manage the process. An input vertex pool (IVP) is initialized to contain all of the input vertices received at block 702, and a corresponding input surface-normal pool (INP) is initialized to contain all of the input surface normals. Additional pools are initialized as being empty, including a first seed vertex pool (SVP1) and first surface-normal pool (SNP1), a second seed vertex pool (SVP2) and second surface-normal pool (SNP2), an aligned vertex pool (AVP) and aligned surface-normal pool (ANP), and an output vertex pool (OVP) and output surface-normal pool (ONP).

At block 706, a number of initial seed vertices in the seed region and corresponding seed surface normals are selected. The number of initial seed vertices can be set to any positive natural number (one or more). In some embodiments, each initial seed surface normal can be a surface normal that is in the seed region and parallel to a reference vector. The reference vector can be defined according to the image orientation standardization and seed region, as well as the cartilage type. For example, given the RAS+image orientation, the reference vectors for the femoral cartilage and tibial cartilage can be set to [0, 0, 1] and [0, 0, −1], respectively. The initial seed vertices can be selected as the vertices corresponding to the initial seed surface normals. At block 708, the initial seed surface normals and initial seed vertices are added to the first seed surface-normal pool SNP1 and first seed vertex pool SVP1.

At block 710, a determination is made as to whether the input vertex pool IVP is empty. If not, then at block 712, an iteration of the main processing loop is performed. Process 700 ends (block 714) when an iteration of the main processing loop ends with IVP empty.

The main processing loop performed at block 712 can include a loop over all vertices in the first seed vertex pool SVP1 to identify and orient neighboring surface normals to the surface normal of a seed vertex (shown in FIG. 7B) and post-processing to update various pools (shown in FIG. 7C). Referring to FIG. 7B, at block 722, a seed vertex $v_i$ can be selected from first seed pool SVP1 and the corresponding surface normal $n_i$ can be selected from first surface-normal pool SNP1. At block 724, a searching region size is defined and a Boolean variable "flag_new_seeds" is set based on the size of the input vertex pool IVP. For example, if the number of vertices in IVP is larger than the input neighborhood-size parameter, the searching region size can be set to the neighborhood size and flag_new_seeds can be set to True (logical 1); otherwise, the searching region size can be set to the number of vertices in IVP and flag_new_seeds can be set to False (logical 0).

At block 726, a maximum searching distance ($D_{max}$) can be set based on the searching region size. For instance, given a voxel size [a, b, c] and a searching region size g, the maximum searching distance can be computed as $D_{max} = \sqrt{g(a^2 + b^2 + c^2)}$.

At block 728, neighboring vertices $v_k$ and corresponding surface normals $n_k$ can be identified. For instance, any vertex in the input vertex pool IVP whose distance to seed vertex $v_i$ is less than $D_{max}$ can be identified as a neighboring vertex.

At block 730, the surface normals $n_k$ can be aligned to seed surface normal $n_i$. For example, the dot product $n_k \cdot n_i$ can be computed, and the orientation of $n_k$ can be flipped (e.g., by flipping the sign of each component) if the dot product is negative.

At block 732, if the number of neighboring vertices found at block 728 is less than the searching region size, the Boolean variable flag_new_seeds can be set to False; otherwise flag_new_seeds is not changed.

At block 734, if flag_new_seeds is False, then at block 744, all neighboring vertices $19_k$ that were found at block 728 can be added to aligned vertex pool AVP and their aligned surface normals can be added to aligned surface-normal pool ANP.

At block 734, if flag_new_seeds is True, then some of the neighboring vertices and their corresponding surface normals can be added to the second seed vertex pool SVP2 and second seed surface-normal pool SNP2 instead of to AVP and ANP. For example, at block 736, a seed number ($n_{seed}$) can be defined as $n_{seed} = 4\sqrt{n_{neigh} - 4}$, where $n_{neigh}$ is the neighborhood size defined at block 702. At block 738, the number $n_{seed}$ of farthest neighbor vertices $v_k$ from seed vertex $v_i$ can be found; at block 740, these $n_{seed}$ vertices can be added to the second seed vertex pool SVP2 and their corresponding surface normals can be added to the second seed surface-normal pool SNP2. At block 742, all neighbor vertices $v_k$ that were not added to SVP2 can be added to aligned vertex pool AVP and their corresponding surface normals can be added to aligned surface-normal pool ANP.

At block 746, if more seed vertices remain to be processed in SVP1, main processing loop 712 can return to block 722 to select another seed vertex and surface normal.

After all seed vertices in SVP1 have been processed, additional updates to various pools can be performed, as shown in FIG. 7C. For instance, at block 752, the aligned vertex pool AVP and aligned surface-normal pool ANP are added (merged) into the output vertex pool OVP and output surface-normal pool ONP. At block 754, vertices in the aligned vertex pool AVP and surface normals in the aligned surface-normal pool ANP are removed from the input vertex pool IVP and input surface-normal pool INP. At block 756, a determination can be made as to whether the input vertex pool IVP is empty. If so, then the first seed vertex pool SVP1 and first surface-normal pool SNP1 are emptied at block 758.

If, at block 756, the input vertex pool IVP is not empty, then a determination can be made at block 760 as to whether the second seed vertex pool SVP2 is empty. If so, the input vertex pool IVP and input surface-normal pool INP are added (merged) into the output vertex pool OVP and output surface-normal pool ONP at block 762. Subsequently, the input vertex pool IVP, input surface-normal pool INP, first seed vertex pool SVP1, and first seed surface-normal pool SNP1 are emptied at block 764. If, at block 760, SVP2 is not empty, then a determination can be made at block 766 as to whether the second seed vertex pool SVP2 is a subset of the aligned vertex pool AVP. If so, then at block 768, the first seed vertex pool SVP1 is redefined as including all vertices in SVP2, and the first seed surface-normal pool SNP1 is redefined as including all surface normals in SNP2. At block 770, all vertices in SVP2 are subtracted (removed) from output vertex pool OVP and all surface normals in SNP2 are subtracted (removed) from output surface normal pool ONP. At block 772, all vertices in SVP2 are added back to the input vertex pool IVP, and all surface normals in SNP2 are added back to the input surface-normal pool INP. If, at block 766, SVP2 is not a subset of AVP, then at block 774, the first seed vertex pool SVP1 is redefined as including all vertices in SVP2 that are not in AVP, and the first seed surface-normal pool SVP1 is redefined as including all surface normals in SNP2 that are not in ANP.

At block 776, cleanup operations can be performed in preparation for the next iteration of main processing loop 712. For example, AVP, ANP, SVP2, and SNP2 can all be emptied.

Figure 8A:
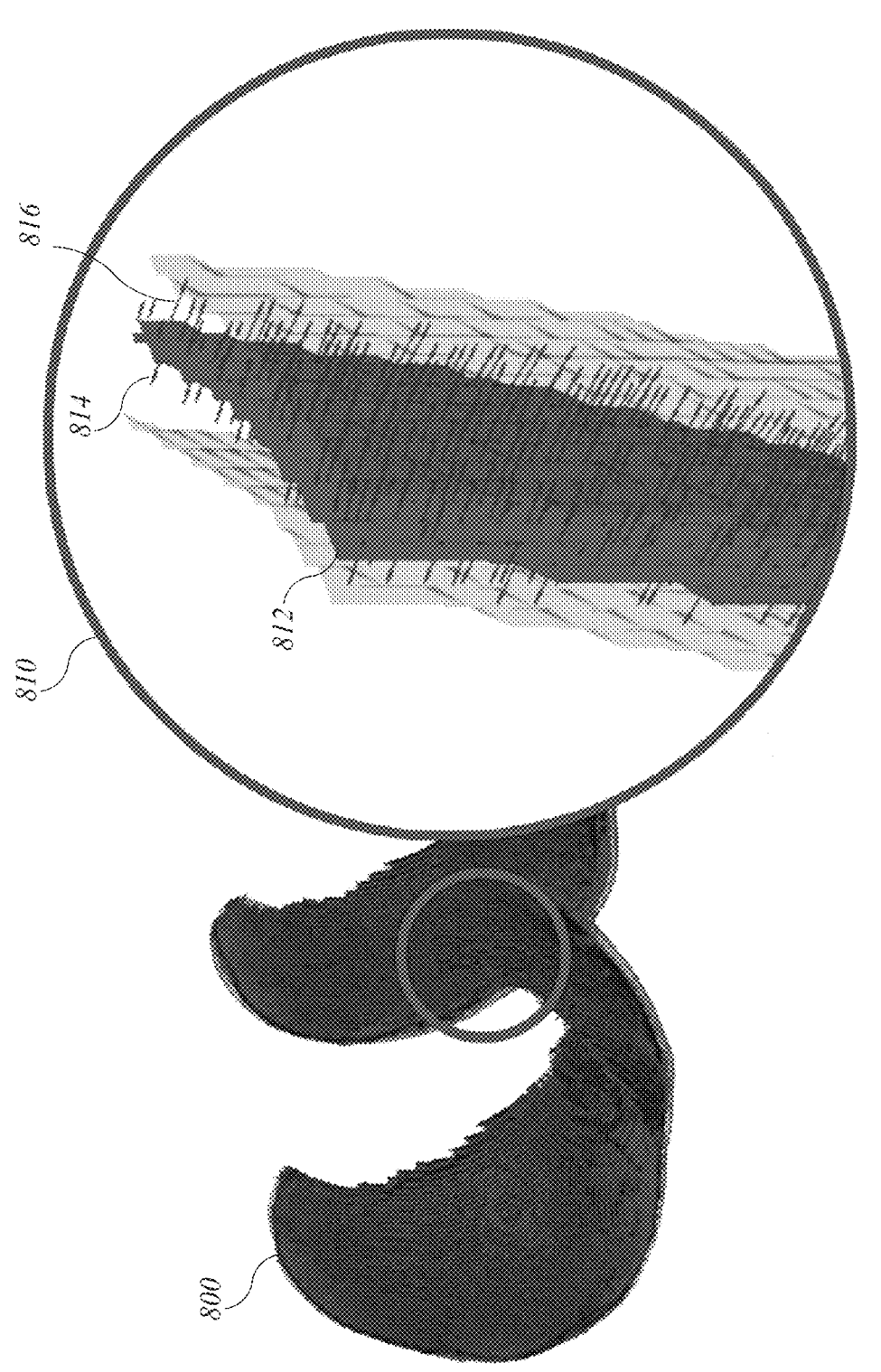
FIGS. 8A and 8B show examples of surface meshes at various stages of the process of FIGS. 7A-7C according to some embodiments.
Figure 8B:
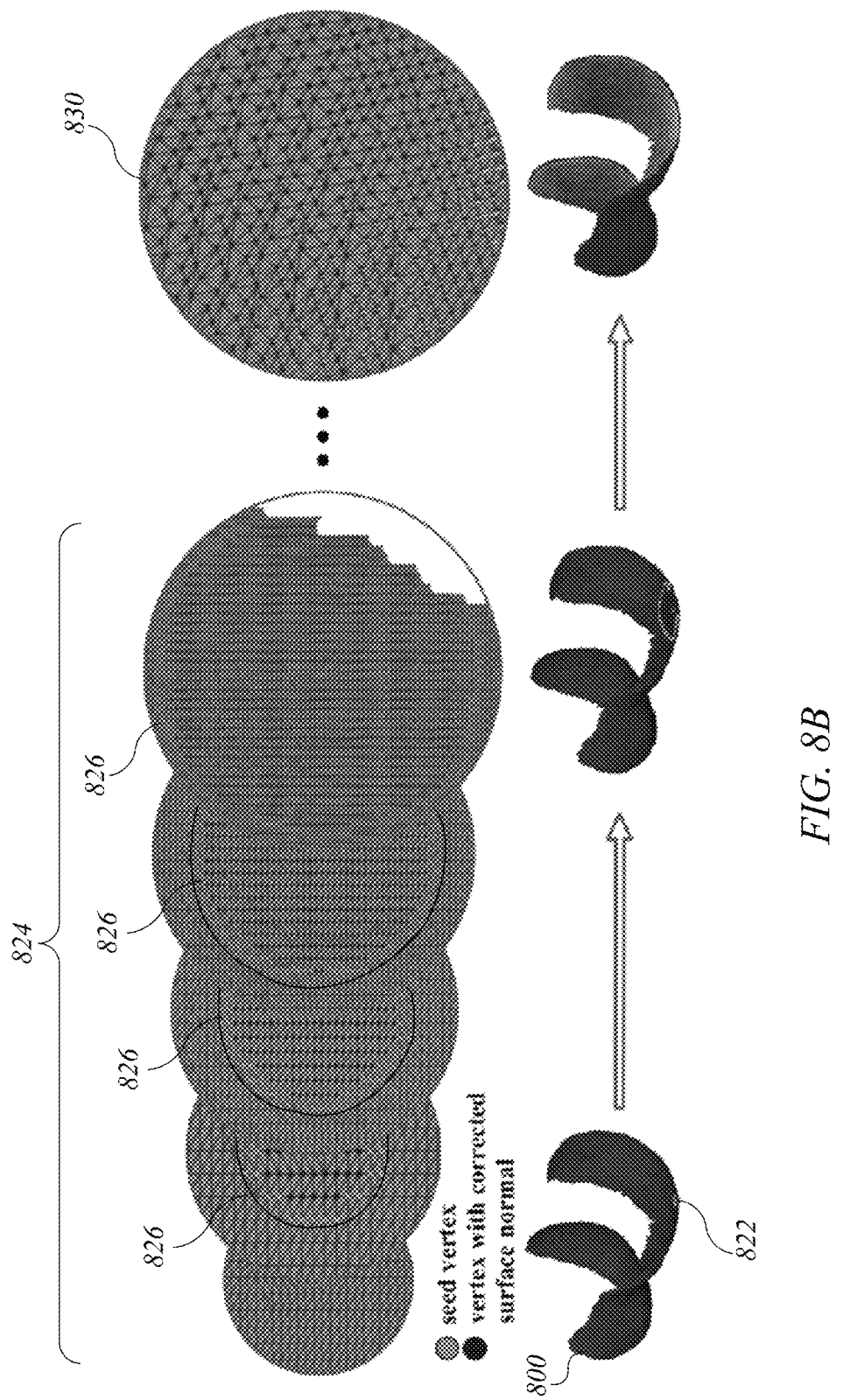

FIGS. 8A and 8B show maps illustrating the effect of process 700 according to some embodiments. FIG. 8A shows a map of cartilage surface normals generated using SVD for a cartilage surface 800. As best seen in inset 810, surface mesh 812 is decorated with arrows indicating the surface normals. The orientation is initially random, with some surface normals (e.g., surface normal 814) pointed toward the inner surface and other surface normal (e.g., surface normal 816) pointed toward the outer surface. As shown in FIG. 8B, process 700 begins with an initial seed vertex in a seed region 822 of cartilage surface 800 and flips neighboring surface normals as needed to achieve consistent orientation (e.g., toward the outer surface for vertices on the inner surface). Sequence 824 shows a portion of the surface mesh at different iterations of main processing loop 712, illustrating how the region 826 having orientation-corrected surface normals expands to include larger numbers of vertices as main processing loop 712 is iteratively executed. At each iteration, vertices near the periphery of the aligned region 826 are selected as new seeds for the next iteration. Eventually, as shown at 830, consistent orientation is obtained for the surface normals for all vertices.

In some embodiments, spatial smoothing of surface normals may be performed after orientation correction. In this context, it is noted that surface normals may be determined for a polygon mesh (e.g., triangle mesh) representing the cartilage surfaces. The polygons may not correspond to the physical structure of the cartilage and may induce artificial local variations between surface normals associated with adjacent or neighboring vertices. In particular, the number of neighbors (k) used in surface-normal estimation as described above can significantly affect the local variation: larger k can reduce local variation but can decrease accuracy. Smaller k can make SVD more sensitive to local changes in the surface mesh but can decrease spatial consistency of the surface normals. In some embodiments, a small value of k is preferred, in the interest of increasing accuracy. Spatial smoothing can be applied to the surface normals to improve spatial consistency. For example, spatial smoothing can be implemented by replacing each normal vector with a mean normal vector obtained from neighboring vertices. One or more iterations of spatial smoothing can be applied.

Accordingly, in some embodiments, the surface normals can be computed as:

$$\mathfrak{N}(p) = O_{ss}(O_{oc}(\mathfrak{N}(p))), \ p \in M_{i,c}^{in}, \tag{20}$$

where $O_{oc}(\cdot)$ denotes an orientation correction operation (e.g., process 700) and $O_{ss}(\cdot)$ denotes spatial smoothing.

2.2.2. Cartilage Thickness Mapping

As described above, a set of surface normals $\mathfrak{N}$ (p) can be obtained for a reference surface, e.g., inner surface $$M_{i,c}^{in}.$$

Given the surface normals, cartilage thickness $\mathfrak{T}$ can be measured along the normal directions:

$$\mathfrak{T} = O_{th}\big(M_{i,c}^{in}, M_{i,c}^{out}, \mathfrak{N}\big). \tag{21}$$

where $O_{th}(\cdot)$ denotes a thickness measuring operation. In some embodiments, $O_{th}(\cdot)$ determines a Euclidean distance along each surface normal from the corresponding vertex location on the inner surface $$M_{i,c}^{in}$$

to a location on the outer surface $$M_{i,c}^{out}.$$

In some cases, however, some regions of the cartilage may be one voxel thick. For these vertices, there is no destination on the outer surface, although the thickness of the cartilage might not be zero. Accordingly, some embodiments provide methods to assign a non-zero thickness to all vertices on the inner surface, e.g., by leveraging quantified uncertainty in the thickness mapping.

For instance, a voxel sampled from a boundary between two tissue types (e.g., bone and cartilage or cartilage and other non-bony tissues) contains signal contributions from both tissue types. This creates uncertainty in classifying the voxel as corresponding to one or the other tissue type. It can be assumed that the signal is dominated by the major tissue type within a voxel, but the hypothetical "true" boundary between tissue types can span half (or some other fraction) of the voxel volume, resulting in uncertainty associated with the classification. In some embodiments, thickness can be estimated by using an ellipsoid model to represent a voxel. Placing the smoothed surface normal at the center of the ellipsoid model, a plane through the center of the ellipsoid model and perpendicular to the smoothed surface normal can be defined. This plane splits the ellipsoid into two halves. The uncertainty can be calculated as the distance between the center and the intersection of the smoothed surface normal and ellipsoid surface. The thickness measurement can include the uncertainty represented by the ellipse.

Figures 9A, 9B:
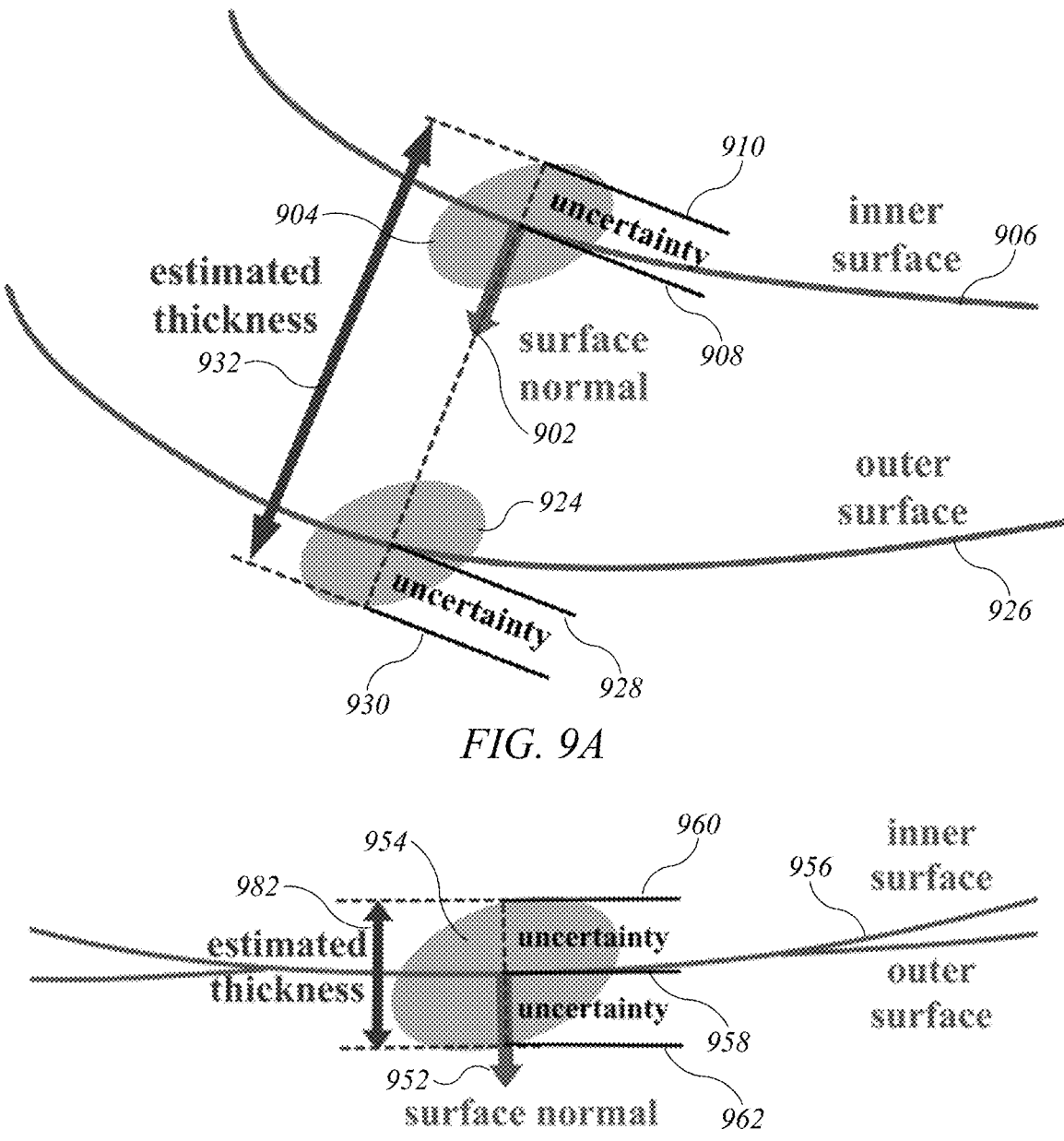
FIGS. 9A and 9B show diagrams illustrating thickness measurements that incorporate uncertainty estimates according to some embodiments.

FIGS. 9A and 9B show diagrams illustrating thickness measurements that incorporate uncertainty estimates according to some embodiments. In FIG. 9A, the cartilage is more than one voxel thick. A surface normal 902 and uncertainty ellipse 904 centered at the origin of surface normal 902 are shown for a voxel on inner surface 906. A plane 908 perpendicular to surface normal 902 through the center of ellipse 906 is defined. The uncertainty estimate extends inward to a plane 910 that is parallel to plane 908 and tangential to ellipse 904. Similarly, at the outer surface 926, an uncertainty ellipse 924 is centered at the point where an extension of surface normal 902 intersects outer surface 926. A plane 928 perpendicular to surface normal 902 through the center of ellipse 924 is defined. The uncertainty estimate extends outward to a plane 930 that is parallel to plane 928 and tangential to ellipse 924. The estimated cartilage thickness 932 can be defined as the distance between planes 910 and 930.

In FIG. 9B, the cartilage is one voxel (or less) thick. A surface normal 952 and uncertainty ellipse 954 centered at the origin of surface normal 952 are shown for a voxel on inner surface 956. A plane 958 perpendicular to surface normal 952 through the center of ellipse 954 is defined. The uncertainty estimate extends inward to a plane 960 that is parallel to plane 958 and tangential to ellipse 954 and extends outward to a plane 962 that is also parallel to plane 958 and tangential to ellipse 954. The estimated cartilage thickness 982 is defined as the distance between planes 960 and 962.

Inclusion of uncertainty in thickness estimates can provide a thickness map that more accurately reflects the true surface morphology of the cartilage. In addition, regions of partial cartilage loss (thin cartilage) and regions of full cartilage loss can be distinguished. Techniques for identifying and quantifying regions of full-thickness cartilage loss are described below.

In some embodiments, additional smoothing can be applied to the thickness map to reduce local fluctuations (e.g., due to noise) therein. The smoothed thickness map can allow a user to focus on the global pattern of cartilage thickness, facilitating identification of regions of thin, thick, or absent cartilage.

Figure 10:
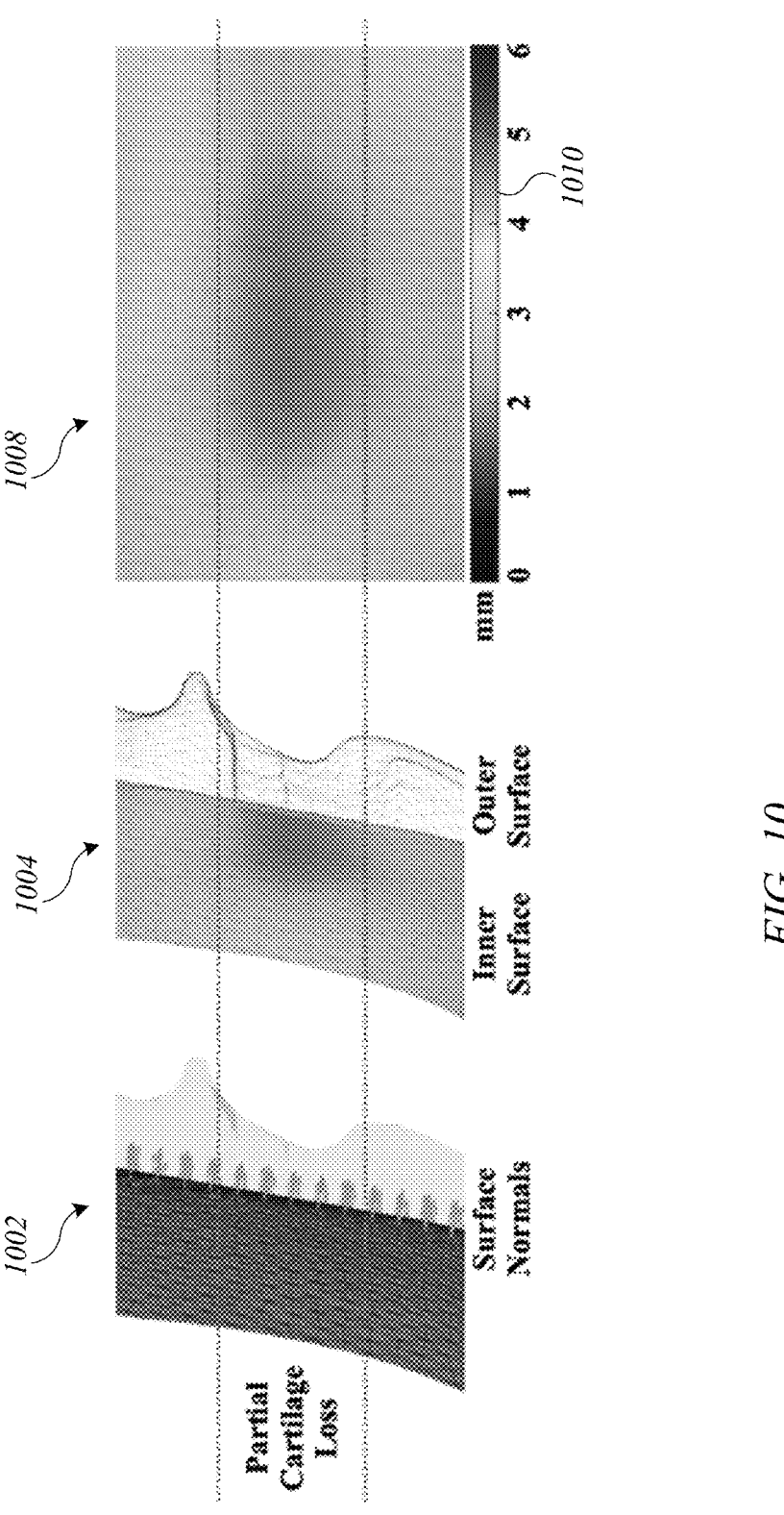
FIG. 10 shows an example of a cartilage thickness map according to some embodiments.

FIG. 10 shows an example of a cartilage thickness map according to some embodiments. Surface normal for the inner surface are shown at 1002. A thickness map is shown in an anatomical view at 1004 and a 2D projected view at 1008. Legend 1010 shows a color coding indicating cartilage thickness in mm. Partial cartilage loss can be observed as thinner regions in maps 1004 and 1008.

Figure 11:
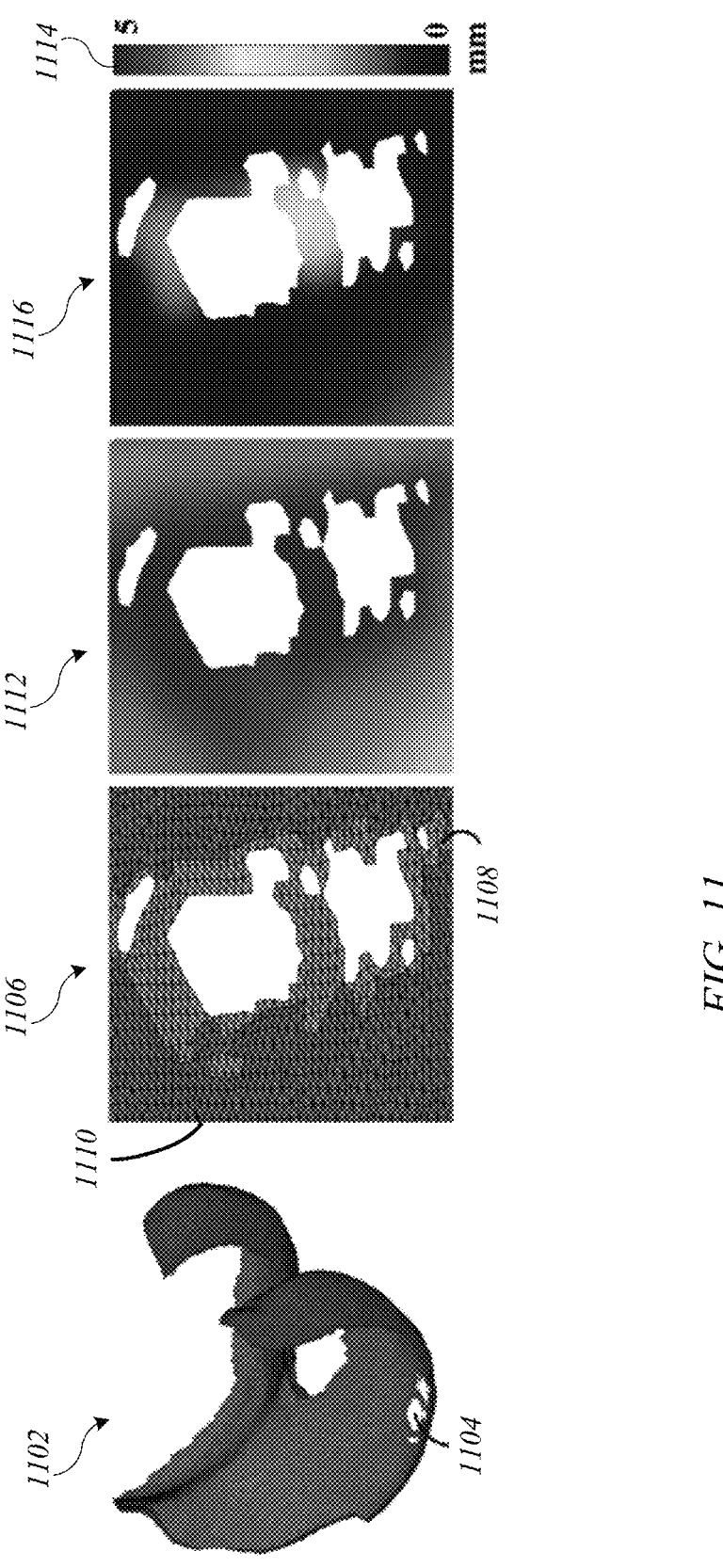
FIG. 11 shows another example of a cartilage thickness map according to some embodiments.

FIG. 11 shows another example of a cartilage thickness map according to some embodiments. In this example, an area of full thickness cartilage loss (FCL) is present. A rendering of cartilage 1102 shows FCL in region 1104. Shown in rendering 1106 are a portion of the inner cartilage surface 1108 (red) and outer cartilage surface (blue) 1110 as determined using techniques described above. It should be noted that the hole-filling processes described in section 2.1 do not fill FCL region 1104. The view in rendering 1106 is from the outer surface 1110, and portions of inner surface 1108 are visible where the cartilage thickness is one voxel. Shown at 1112 is a thickness map determined using the meshes from rendering 1106. Thickness map 1112 is color coded as shown in legend 1114, and white areas indicate FCL. For comparison, shown at 1116 is a thickness map obtained using a conventional 3D nearest-neighbor (3dNN) approach, with the same color coding. In this example, in regions with a single layer of voxels, the 3dNN approach shows overestimation of cartilage thickness in central areas and underestimation in areas where the inner and outer surfaces are in contact.

Figure 12:
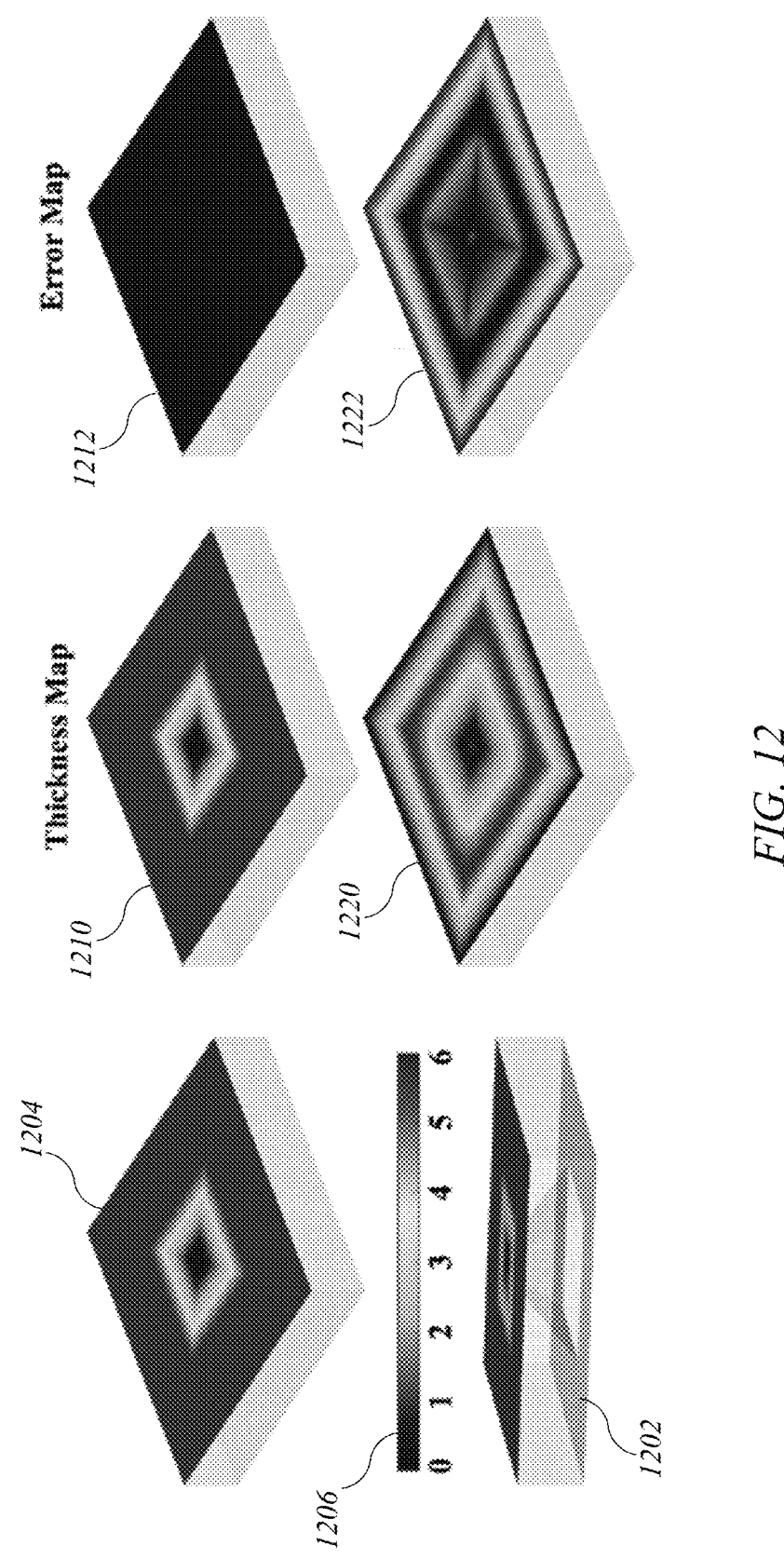
FIG. 12 shows an example of a cartilage thickness map computed from synthetic data according to an embodiment and a cartilage thickness map computed from the same synthetic data using a conventional approach.

FIG. 12 shows an example using synthetic data to compare a cartilage thickness map according to an embodiment and a cartilage thickness map obtained using a conventional 3dNN approach. Synthetic data for a cuboid 1202 having a defect was generated. The corresponding ground-truth thickness map is shown at 1204. (All thickness maps in FIG. 12 are color coded as shown in legend 1206.) Thickness map 1210 was generated from synthetic data 1202 using processes described above. Thickness map 1220 was generated from synthetic data 1202 using a conventional 3dNN approach. Error maps 1212, 1222 quantify the difference between ground truth thickness map 1204 and thickness maps 1210, 1220, respectively. As shown, map 1210 generated using techniques described herein is more accurate than conventional 3dNN map 1220, particularly in peripheral regions.

2.3. Full-Thickness Cartilage Loss (FCL) Estimation

In some clinical applications it can be helpful to quantify the extent of FCL. For instance, FCL can be quantified as the percentage of the subchondral bone area without cartilage coverage, which is equivalent to the percentage of the denuded area.

Figure 14:
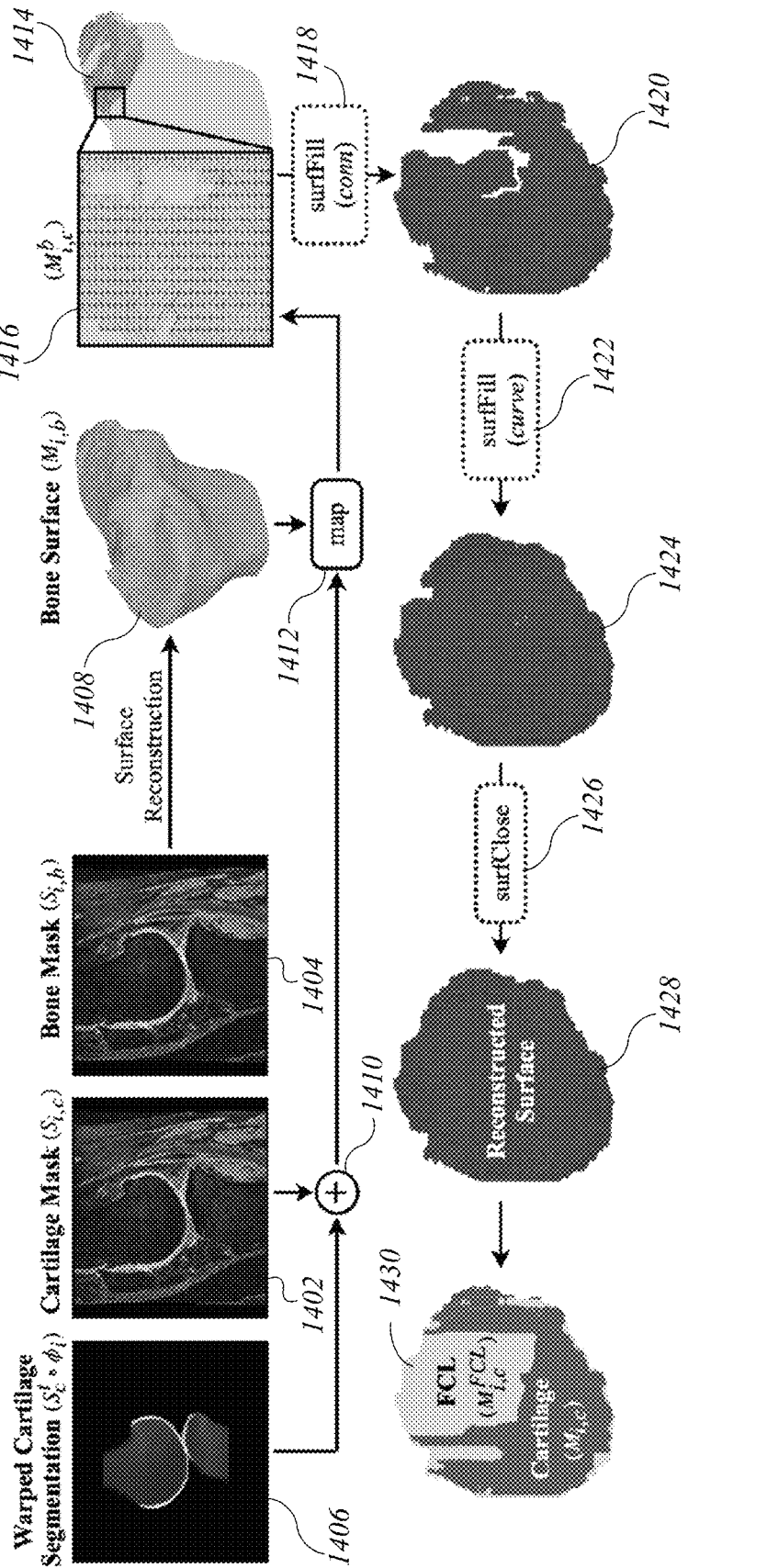
FIG. 14 shows images illustrating various stages of the process of FIG. 13 according to some embodiments.

FIG. 13 shows a flow diagram of a process 1300 for FCL estimation according to some embodiments, and FIG. 14 shows images further illustrating process 1300. Inputs to process 1300 at block 1302 can include a cartilage segmentation mask $S_{i,c}$ (image 1402 in FIG. 14), a bone segmentation mask $S_{i,b}$ (image 1404), and a warped cartilage segmentation template $$S_c^t \circ \phi_i$$

(image 1406). These inputs can be obtained using techniques described in Section 1 above or other techniques.

At block 1304, a bone surface mesh M (image 1408) is reconstructed from bone segmentation mask $S_{i,b}$, e.g., using Marching Cubes or the like. At block 1306, cartilage segmentation mask $S_{i,c}$ and warped cartilage segmentation template $$S_c^t \circ \phi_i$$

are merged (operation 1410) and mapped (operation 1412) onto bone surface mesh $M_{i,b}$ to produce a template-based cartilage surface mesh $$M_{i,c}^b$$

(mesh 1414). Put differently, according to some embodiments $$M_{i,c}^b = \mathcal{O}_m(S_{i,c} \cap (S_c^t \circ \phi_i), M_{i,b}), \tag{22}$$

where $\mathcal{O}_m(\cdot,\cdot)$ denotes voxel-to-surface mapping. Inset 1416 in FIG. 14 shows a 2D grid view of a portion of template-based cartilage surface mesh $$M_{i,c}^b.$$

At block 1308, one or more surface-hole-filling operations can be performed on template-based cartilage surface mesh $$M_{i,c}^b$$

to produce a modified surface. For example, as shown in FIG. 14, a first surface-hole-filling operation 1418 can be performed on template-based cartilage surface mesh $$M_{i,c}^b$$

to produce a first modified surface 1420. Operation 1418 can implement a connectivity-based hole filling technique (which can be a conventional or other technique). A second surface-hole-filling operation 1422 can be performed on surface 1420 to produce a second modified surface 1424. Operation 1422 can implement a curve-fitting-based hole filling technique (which can also be a conventional or other technique). The curve-fitting-based technique can detect penetrative lesions that extend to the edge of the cartilage. In some embodiments, curve fitting for tibial cartilage can be performed using Cartesian coordinates while curve fitting for femoral cartilage (which has a curved surface) is performed using polar coordinates. Use of both connectivity-based and curve-fitting-based techniques can improve robustness of FCL estimation. At block 1310, a surface closing operation 1426 can be performed on surface 1424 to produce a reconstructed surface 1428. Reconstructed surface 1428 represents the inner cartilage surface that would be expected in the absence of FCL. Surface closing operation 1426 can be implemented, e.g., as described above with reference to FIGS. 3A-3C. At block 1312, an FCL surface mesh $$M_{i,c}^{FCL}$$

can be estimated by subtracting the cartilage surface mesh $M_{i,c}$ (which can be reconstructed as described in Section 2.1 above) from reconstructed surface 1428. An example result is illustrated at 1430.

To summarize process 1300, according to some embodiments FCL estimation can be implemented by computing an FCL surface:

$$M_{i,c}^{FCL} = \mathcal{O}_c\big(\mathcal{O}_{sf}(M_{i,c}^b, M_{i,b})|M_{i,b}\big) - M_{i,c}, \qquad (23)$$

where $\mathcal{O}_c(\cdot|\cdot)$ denotes the surface close operation described above and $\mathcal{O}_{sf}(\cdot)$ denotes surface-hole-filling, which can include connectivity-based hole filling followed by curve-based hole filling. In some embodiments, the order of hole filling operations can be reversed, and different hole-filling algorithms can be applied.

Figure 15:
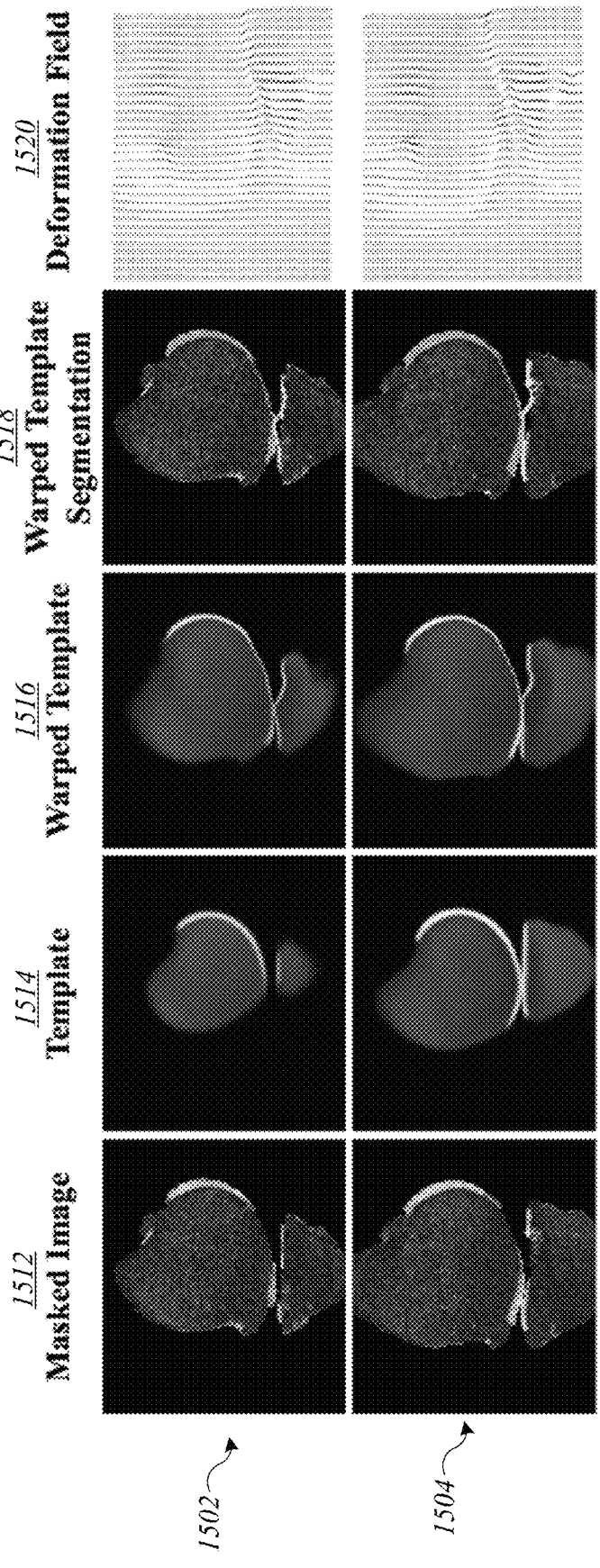
FIG. 15 shows images illustrating template-to-image registration according to some embodiments.

In process 1300, prior knowledge of knee anatomy can be used to facilitate FCL estimation. For instance, the segmentation masks of the template image $$S_c^t$$

represent normal shapes and positions of cartilage; warping of the template can account for individual variation in bone shape. FIG. 15 shows images illustrating the effectiveness of the template-to-image registration according to some embodiments. The two rows 1502, 1504 correspond to two different images. The masked cartilage image $S_{i,c}$ is highlighted in column 1512; denuded areas indicating FCL can be seen. Column 1514 shows corresponding template images $$S_c^t$$

(with no denuded areas). Column 1516 shows warped template images $$S_c^t \circ \phi_i.$$

Column 1518 shows the cartilage segmentation mask for the warped template, and column 1520 shows the deformation field $\phi_i$ using a color-coding scheme. FIG. 15 shows that the warped template cartilage segmentation mask covers not only regions of cartilage but also denuded areas, allowing reconstruction of the regions of FCL.

2.4. Cartilage Parcellation and Regional Quantification

In some embodiments, it can be useful to parcellate (or subdivide) the cartilage into particular subregions of interest. For instance a set of 20 regions has been defined in the literature (see, e.g., Wirth et al., Regional analysis of femorotibial cartilage loss in a subsample from the osteoarthritis initiative progression subcohort, Osteoarthritis and Cartilage 17, 291-297 (2009)).

Prior to parcellation, the input image (e.g., MR image) can be reoriented according to the RAS+convention, where the positive axes of the image coordinate system point in the right, anterior, and superior directions. With the knee side information and consistent image orientation, the medial, lateral, interior, and exterior compartments can be identified automatically (e.g., using existing techniques). For purposes of the present description, it is assumed that a reconstructed surface with FCL (e.g., surface 1428) has been obtained using process 1300 or similar process. In alternative implementations, parcellation techniques described herein can be applied to the cartilage volume in addition to or instead of the surfaces.

According to some embodiments, parcellation of femoral cartilage (FC) can be performed as follows:

(1) Identify the intercondylar notch.

(2) Define a sagittal cutting plane that goes through the intercondylar notch.

(3) Split the FC into medial and lateral femoral condyles (MFC and LFC) using the sagittal cutting plane.

(4) Define an anterior cutting plane (parallel to the coronal slices) that goes through the intercondylar notch and a posterior cutting plane at a position corresponding to 60% of the distance from the intercondylar notch to the posterior end of the femoral condyles.

(5) Define the central regions of the femoral condyles (cMFC and cLFC) as the areas between the anterior and posterior cutting planes, anterior regions (aMFC and aLFC) as the areas anterior to the anterior cutting plane, and posterior regions (pMFC and pLFC) as the areas posterior to the posterior cutting plane.

(6) Split each of the central femoral condyles (cMFC and cLFC) into three equal areas in the left-right direction, defined as exterior compartments (ecMFC, ecLFC), central compartments (ccMFC, ccLFC), and interior compartments (icMFC, icLFC).

According to some embodiments, parcellation of tibial cartilage (TC) can be performed as follows:

(1) Define a central region of each of the MTC and LTC as an elliptical region of interest (ROI) that covers 20% of the cartilaginous surface; these central regions are denoted as cMTC and cLTC. More specifically, the ellipse can be centered and aligned with the two principal directions estimated using SVD applied to all points of the MTC or LTC as appropriate. Estimation of principal directions can be similar to surface normal estimation described above, except that the right-singular vectors corresponding to the two largest singular values (referred to herein as $\sigma_1$ and $\sigma_2$ where $\sigma_1 > \sigma_2$) are used to define the two principal directions. The semi-major axis (length $d_1$) and semi-minor axis (length $d_2$) of the ellipse can be constrained such that $d_1/d_2 = (\sigma_1/\sigma_2)^{1/2}$.

(2) Subdivide the peripheral region of the tibial cartilage (outside the ellipse) into four compartments, e.g., using conventional definitions. (One set of definitions is given in Wirth and Eckstein, A technique for regional analysis of femorotibial cartilage thickness based on quantitative magnetic resonance imaging, IEEE Transactions on Medical Imaging 27, 737-744 (2008).) These compartments can be labeled as anterior (aMTC, aLTC), exterior (eMTC, eLTC), posterior (pMTC, pLTC), and interior (iMTC, iLTC) compartments according to their positions.

Figure 16:
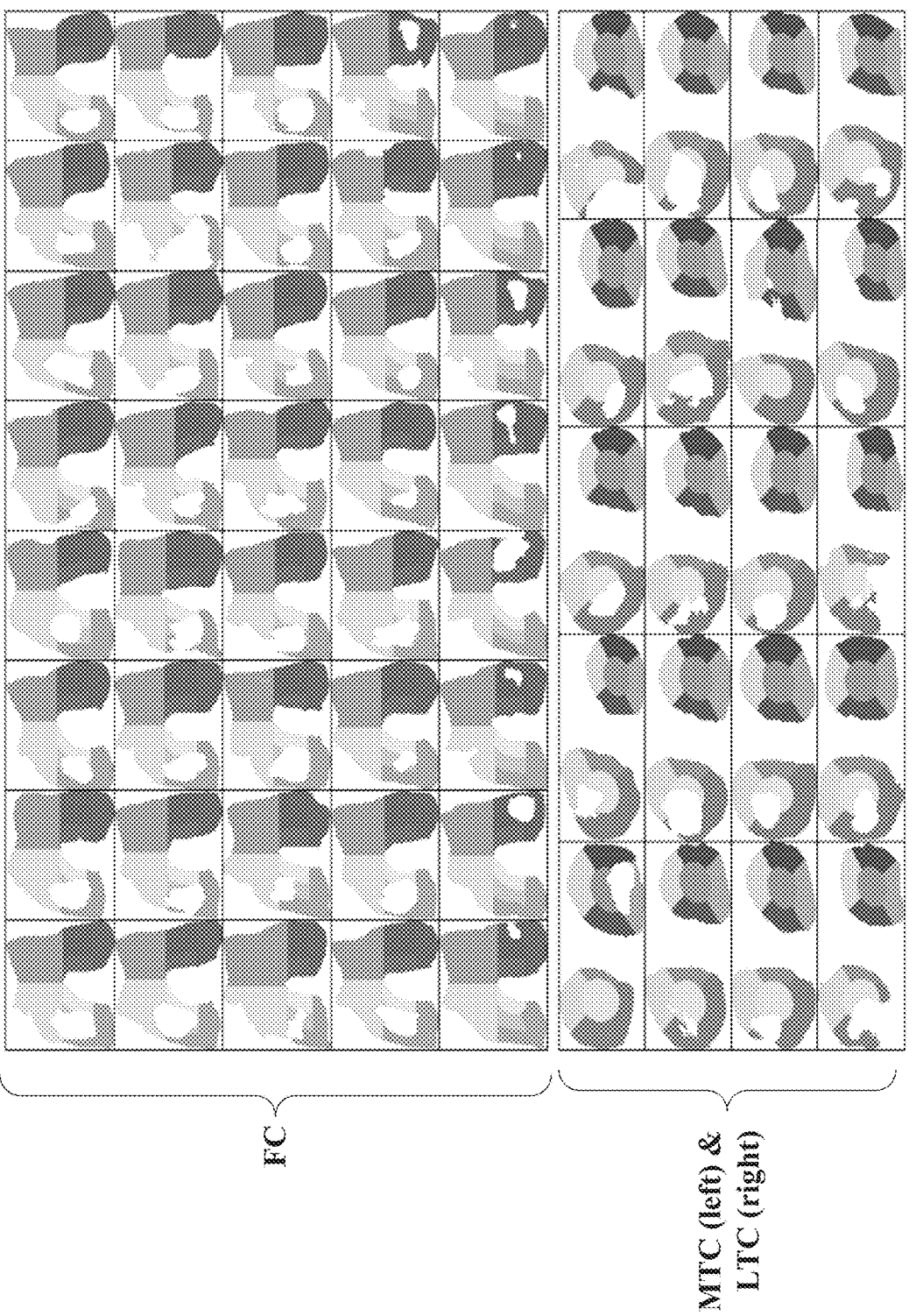
FIG. 16 shows images of parcellated cartilage subregions obtained from cartilage segmentation masks according to some embodiments.

FIG. 16 shows renderings of parcellated cartilage surfaces obtained from cartilage surface meshes according to some embodiments. The surface meshes are obtained using techniques described in Section 2.1 and parcellated using the rules set forth above; the colors distinguish different subregions. Each rendering corresponds to a subject having severe cartilage defects (Kellgren-Lawrence (KL) grade of 4). The parcellated subregions are distinguished using color coding. FIG. 16 shows that rule-based parcellation is consistent across subjects and robust to FCL.

In some embodiments, cartilage thickness in each parcellated compartment (or region) can be quantified. For example, the surface area of a cartilage region can be defined as the summation of triangular areas of the cartilage mesh, and the volume can be defined as the multiplicative product of the voxel volume and voxel number. In some embodiments, mean thickness, FCL (percentage), surface area, and volume can be output for each cartilage subregion.

3. Additional Embodiments

While the invention has been described with reference to specific embodiments, those skilled in the art will appreciate that numerous modifications are possible. For example, techniques described above can be applied to images of other joints where articular cartilage is present. Various combinations of image analysis techniques for cartilage morphometrics can be performed, including any or all of surface reconstruction, thickness mapping, FCL estimation, and/or parcellation.

All processes described herein are illustrative and can be modified. Operations can be performed in a different order from that described, to the extent that logic permits; operations described above may be omitted or combined; operations described sequentially may be performed in parallel; and operations not expressly described may be added. Different processes can be used separately or together in any combination or subcombination. It should also be noted that surface reconstruction and surface normal estimation techniques of the kind described herein may have applications in contexts other than cartilage analysis, including any context in which reconstruction of a surface and estimation of surface normals is desired.

In some embodiments, data visualization tools can be provided that can display cartilage maps to a user. For example, for each cartilage image, a 3D thickness map and/or an FCL map can be displayed for that image, or an overall image of the whole cartilage surface can be rendered, overlaid with or adjacent to a rendering of a thickness map and/or FCL map. In embodiments where a bone mask is available, a cartilage thickness map and/or FCL map can be displayed adjacent to (e.g., in an adjacent window) or overlaid with a rendering of the bone surface. Displaying any combination of a thickness map, an FCL map, a cartilage surface, and/or bone mask at the same time is also an option. In some embodiments, the user may provide input to zoom (in or out), rotate, pan, and otherwise move a displayed image, and displayed images of various maps, surfaces, and/or masks can move synchronously in response to user input. Options can be provided to allow the user to select a desired visualization and/or to view different versions of images, maps, and/or masks (e.g., smoothed or unsmoothed thickness map).

In some embodiments, image analysis operations as described above can be performed in the same computer system that performs image acquisition. In other embodiments, distributed computing systems can be used, and image data acquired using an image acquisition system can be transferred to a different computer system for analysis. It should be understood that a computer system can include hardware components of generally conventional design (e.g., processors, memory and/or other storage devices, user interface components, network interface components) and that program code or other instructions can be provided to the computer system to cause the system to perform computations and/or other processes implementing embodiments described herein or aspects thereof.

Techniques described herein can be implemented by suitable programming of general-purpose computers. A general-purpose computer can include a programmable processor (e.g., one or more microprocessors including a central processing unit (CPU) and one or more co-processors such as graphics processing units (GPUs), or other co-processors optimized to implement nodes of a deep neural network) and memory to store instructions and data used by the programmable processor. A general-purpose computer can also include user interface components such as a display, speakers, keyboard or keypad, mouse, touch pad, track pad, joystick, touch screen, microphone, etc. A general-purpose computer can also include data communication interfaces to transmit data to other computer systems and/or receive data from other computer systems; examples include USB ports; Ethernet ports; other communication ports to which electrical and/or optical signal wires can be connected; and/or antennas and supporting circuitry to implement wireless communication protocols such as Wi-Fi, Bluetooth, NFC (near-field communication), or the like. In some embodiments, a computer system includes a single computer apparatus, where various subsystems can be components of the computer apparatus. The computer apparatus can have a variety of form factors including, e.g., a laptop or tablet computer, a desktop computer, etc. A computer system may include a monitor, printer or other suitable display for providing any of the results mentioned herein to a user. In other embodiments, a computer system can include multiple computer apparatuses, each being a subsystem, with internal components. A computer system can include a plurality of components or subsystems, e.g., connected together by external interface or by an internal interface. In some embodiments, computer systems, subsystems, or apparatuses can communicate over a network. For instance, a computer system can include a server with massive processing power to implement deep neural networks and a client that communicates with the server, providing instructions for specific network structures and operations.

It should be understood that any of the embodiments of the present invention can be implemented in the form of control logic using hardware (e.g., an application specific integrated circuit or field programmable gate array) and/or using computer software with a programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using a programming platform such as MATLAB, or any suitable computer language such as, for example, Java, C, C++, C #, Objective-C, Rust, Golang, Swift, or scripting language such as Perl, Python, or PyTorch, using, for example, conventional or object-oriented techniques. The software code may be stored as a series of instructions or commands on a computer readable storage medium; suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable storage medium may be any combination of such storage devices or other storage devices capable of retaining stored data. Computer readable storage media encoded with the program code may be packaged with a compatible device or provided separately from other devices. Any such computer readable storage medium may reside on or within a single computer product (e.g. a hard drive, a CD, or an entire computer system), and may be present on or within different computer products within a system or network.

Such programs may also be encoded and transmitted using carrier signals adapted for transmission via wired, optical, and/or wireless networks conforming to a variety of protocols, including the Internet. As such, a computer readable transmission medium (which is distinct from a computer readable storage medium) may be created using a data signal encoded with such programs.

Any of the methods described herein may be totally or partially performed with a computer system including one or more processors, which can be configured to perform the steps. Thus, embodiments can involve computer systems configured to perform the steps of any of the methods described herein, potentially with different components performing a respective step or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects.

The above description is illustrative and is not restrictive. Many variations of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A method of analyzing image data including image data corresponding to a region of cartilage, the method comprising:

constructing, using the image data, a first surface mesh corresponding to a first cartilage surface and a second surface mesh corresponding to a second cartilage surface, wherein each of the first surface mesh and the second surface mesh comprises a plurality of vertices and wherein constructing the first surface mesh and the second surface mesh includes:

identifying, in the image data, a set of voxels corresponding to the region of cartilage;

extracting, from the set of voxels, a first subset of voxels corresponding to an inner surface of cartilage and a second subset of voxels corresponding to an outer surface of cartilage;

defining the first surface mesh from the first subset of voxels and the second surface mesh from the second subset of voxels; and performing a surface closing operation on the first surface mesh, wherein the surface closing operation includes one or more iterations of a surface dilation operation on the first surface mesh and one or more iterations of a surface erosion operation on the first surface mesh, wherein each iteration of the surface dilation operation adds neighboring vertices of the region of cartilage to the first surface mesh and each iteration of the surface erosion operation removes marginal vertices from the first surface mesh;

estimating surface normals corresponding to a plurality of locations on the first surface mesh;

computing a distance along each surface normal from the first surface mesh to the second surface mesh;

generating a three-dimensional (3D) cartilage thickness map for the region of cartilage based at least in part on the computed distances; and rendering the 3D cartilage thickness map on a display device.

2. The method of claim 1 wherein estimating the surface normal includes, for each location in the plurality of locations on the first surface mesh:

identifying a plurality of neighbor locations to the location;

constructing a centered position matrix for the location and the plurality of neighbor locations;

performing a singular value decomposition on the centered position matrix; and extracting an initial surface normal from the singular value decomposition.

3. The method of claim 2 wherein estimating the surface normals further includes:

after extracting the initial surface normal for each location in the plurality of locations, performing orientation correction on the initial surface normals such that the surface normals are oriented toward the second surface mesh.

4. A method of analyzing image data including image data corresponding to a region of cartilage, the method comprising:

constructing, using the image data, a first surface mesh corresponding to a bone- cartilage interface surface, wherein the first surface mesh comprises a plurality of vertices and wherein constructing the first surface mesh includes:

identifying, in the image data, a set of voxels corresponding to the region of cartilage;

extracting, from the set of voxels, a first subset of voxels corresponding to an inner surface of the region of cartilage;

defining the first surface mesh from the first subset of voxels; and performing a surface closing operation on at least the first surface mesh, wherein the surface closing operation includes one or more iterations of a surface dilation operation on the first surface mesh and one or more iterations of a surface erosion operation on the first surface mesh, wherein each iteration of the surface dilation operation adds neighboring vertices of the region of cartilage to the first surface mesh and each iteration of the surface erosion operation removes marginal vertices from the first surface mesh;

constructing, using the image data and a cartilage segmentation template, a second surface mesh corresponding to a complete bone-cartilage interface surface;

computing, based on the first surface mesh and the second surface mesh, a third surface mesh representing a region of full-thickness cartilage loss (FCL); and rendering, on a display device, an FCL map based on the second and third surface meshes.

5. The method of claim 4 further comprising:

applying a plurality of parcellation rules to define a plurality of sub-regions of the first surface mesh; and computing a percentage of FCL for each sub-region based on the third surface mesh and the second surface mesh.

6. The method of claim 4 wherein constructing the second surface mesh includes:

obtaining, using the image data, a bone mask and a cartilage mask;

defining a bone surface mesh using the bone mask;

determining a deformation field from the image data;

applying the deformation field to a template cartilage segmentation mask representing normal cartilage to generate a warped cartilage segmentation;

combining the warped cartilage segmentation with the cartilage mask to produce the second surface mesh; and refining the second surface mesh.

7. The method of claim 6 wherein refining the second surface mesh includes applying one or more surface-hole-filling operations to the second surface mesh.

8. The method of claim 7 wherein the one or more surface-hole- filling operations include a connectivity-based hole-filling operation followed by a curve-based hole filling operation.

9. A method of analyzing image data including image data corresponding to a region of cartilage, the method comprising:

extracting, from the image data, a first set of voxels for an inner cartilage surface corresponding to a bone-cartilage interface;

extracting, from the image data, a second set of voxels for an outer cartilage surface;

defining an inner surface mesh from the first set of voxels and an outer surface mesh from the second set of voxels, wherein each of the inner surface mesh and the outer surface mesh comprises a plurality of vertices; and refining the inner surface mesh and the outer surface mesh, wherein refining the inner surface mesh and the outer surface mesh includes performing one or more iterations of a restricted surface dilation operation on the outer surface mesh, wherein each iteration of the restricted surface dilation operation adds neighboring vertices from the region of cartilage, exclusive of the inner surface mesh, to the outer surface mesh; and rendering a three-dimensional (3D) image of the region of cartilage on a display device, based at least in part on the inner surface mesh and the outer surface mesh.

10. The method of claim 9 wherein refining the inner surface mesh and the outer surface mesh includes:

performing a surface closing operation on the inner surface mesh.

11. The method of claim 10 wherein performing the surface closing operation includes:

performing one or more iterations of a surface dilation operation on the inner surface mesh, wherein each iteration of the surface dilation operation adds neighboring vertices of the region of cartilage to the inner surface mesh; thereafter performing one or more iterations of a surface erosion operation on the inner surface mesh, wherein each iteration of the surface erosion operation removes marginal vertices from the inner surface mesh.

12. The method of claim 9 further comprising:

obtaining a cartilage mask identifying one or more voxels in the image data as corresponding to cartilage;

constructing a skeleton surface using the image data;

estimating a surface normal for each voxel on the skeleton surface; and selecting, for each surface normal, a voxel identified in the cartilage mask as one of the first set of voxels.

13. The method of claim 1 wherein computing the distance along each surface normal from the first surface mesh to the second surface mesh further comprises, for at least one of the surface normals:

computing an initial distance along the surface normal from the first surface mesh to the second surface mesh;

determining an uncertainty associated with the surface normal; and adding the uncertainty to the initial distance.

* * * * *